United States Patent
Kwon et al.

(10) Patent No.: US 8,447,225 B2
(45) Date of Patent: May 21, 2013

(54) MOBILE TERMINAL AND GROUP CHAT CONTROLLING METHOD THEREOF

(75) Inventors: Yeaeun Kwon, Yongin-si (KR); Yongmun Gong, Anyang-si (KR); Wonyong Suh, Seoul (KR); Suhjin Yi, Seongnam-si (KR); Sungmin Sohn, Anyang-si (KR); Yunghee Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 313 days.

(21) Appl. No.: 12/824,825

(22) Filed: Jun. 28, 2010

(65) Prior Publication Data

US 2011/0293237 A1 Dec. 1, 2011

(30) Foreign Application Priority Data

May 31, 2010 (KR) .................. 10-2010-0050918

(51) Int. Cl.
  *H04H 20/71* (2008.01)
(52) U.S. Cl.
  USPC .......... 455/3.01; 715/700; 715/764; 715/810; 715/835; 715/838
(58) Field of Classification Search
  None
  See application file for complete search history.

(56) References Cited

U.S. PATENT DOCUMENTS

| 7,577,199 | B1 | 8/2009 | Herz | |
|---|---|---|---|---|
| 8,111,282 | B2* | 2/2012 | Cutler et al. | 348/14.01 |
| 2003/0040917 | A1* | 2/2003 | Fiedler | 704/500 |
| 2006/0095199 | A1* | 5/2006 | Lagassey | 701/117 |
| 2007/0058727 | A1* | 3/2007 | Nakahara et al. | 375/240.24 |
| 2009/0046139 | A1* | 2/2009 | Cutler et al. | 348/14.08 |

FOREIGN PATENT DOCUMENTS

| WO | WO 2004/070963 A1 | 8/2004 |
|---|---|---|
| WO | WO 2004070963 A1 * | 8/2004 |

* cited by examiner

*Primary Examiner* — Fayyaz Alam
*Assistant Examiner* — Mohammed Rachedine
(74) *Attorney, Agent, or Firm* — Birch, Stewart, Kolasch & Birch, LLP

(57) ABSTRACT

A mobile terminal and recording controlling method thereof are disclosed. The present invention includes performing a call with a counterpart terminal, buffering a call content of the performed call by a predetermined time unit, receiving an input of a recording command signal for the performed call, and if receiving the input of the recording command signal, recording the call content from an input point of the recording command signal by including the call content from a random point in a time interval corresponding to the call content buffered up to the input point of the recording command signal.

14 Claims, 44 Drawing Sheets

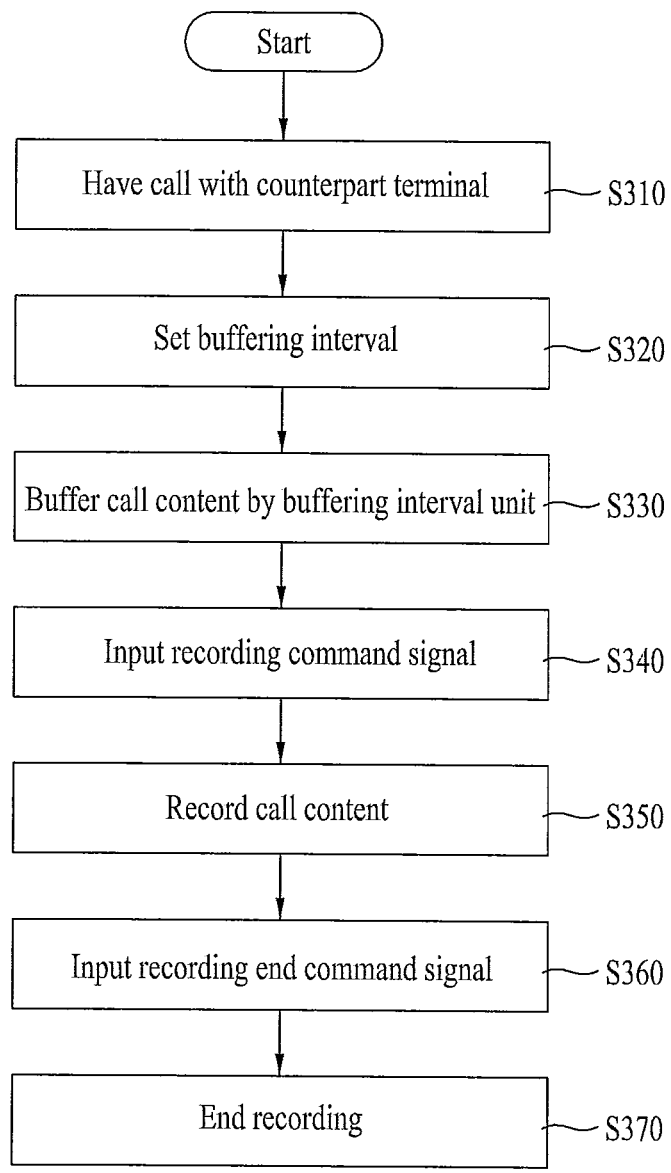

| Call environment setting |
|---|
| 1. Over 10 times a week |
| 2. Over 7 times a week |
| 3. Over 5 times a week |
| 4. Over 10 times a day |
| 5. Over 5 times a day |
| 6. Over 1 time a day |
| 7. Direct setting |
| OK |

FIG. 9A
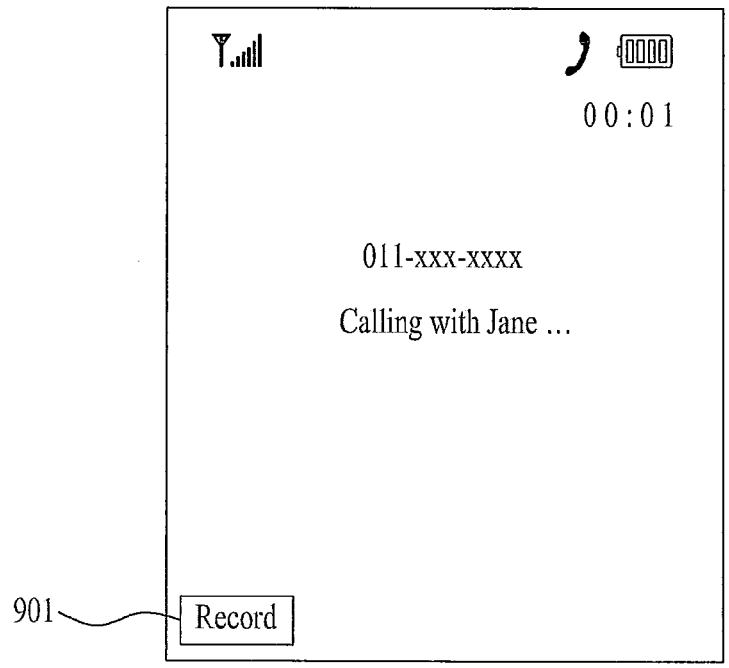
(a)
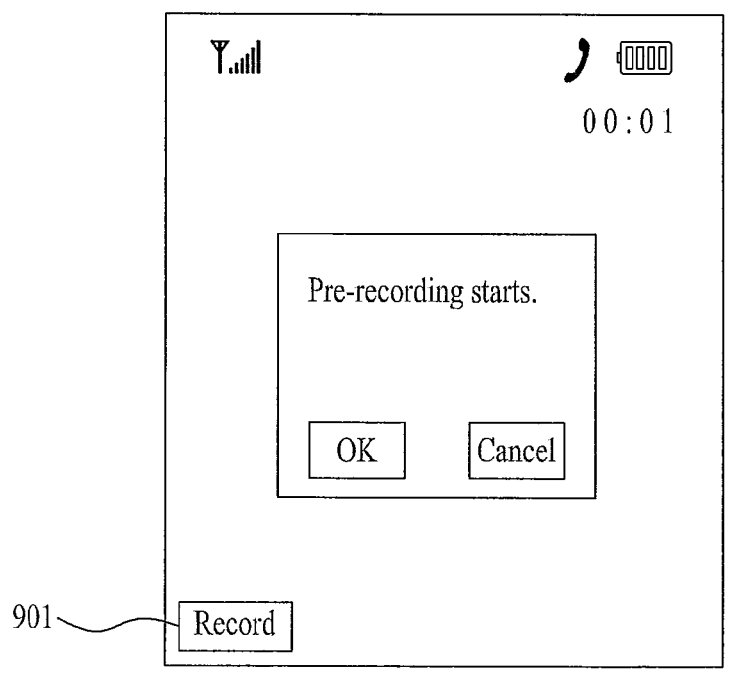
(b)

FIG. 9B
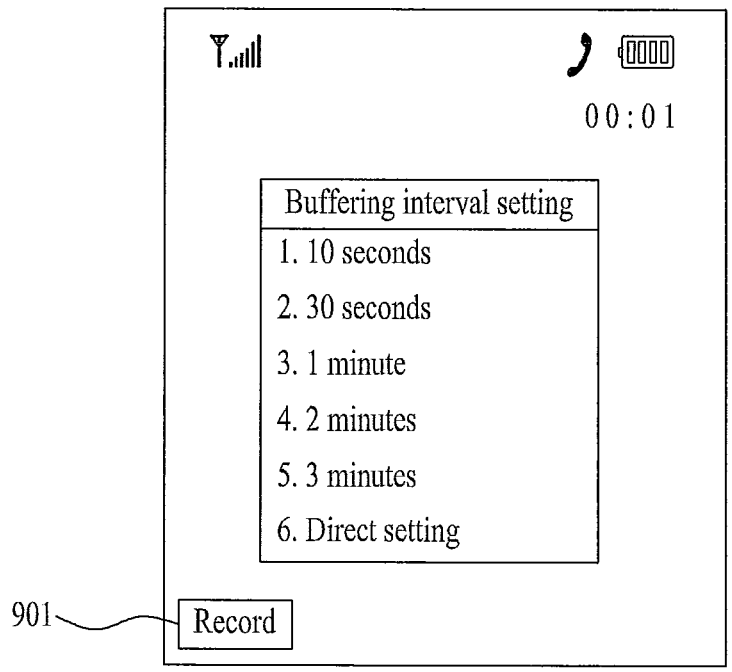
(a)
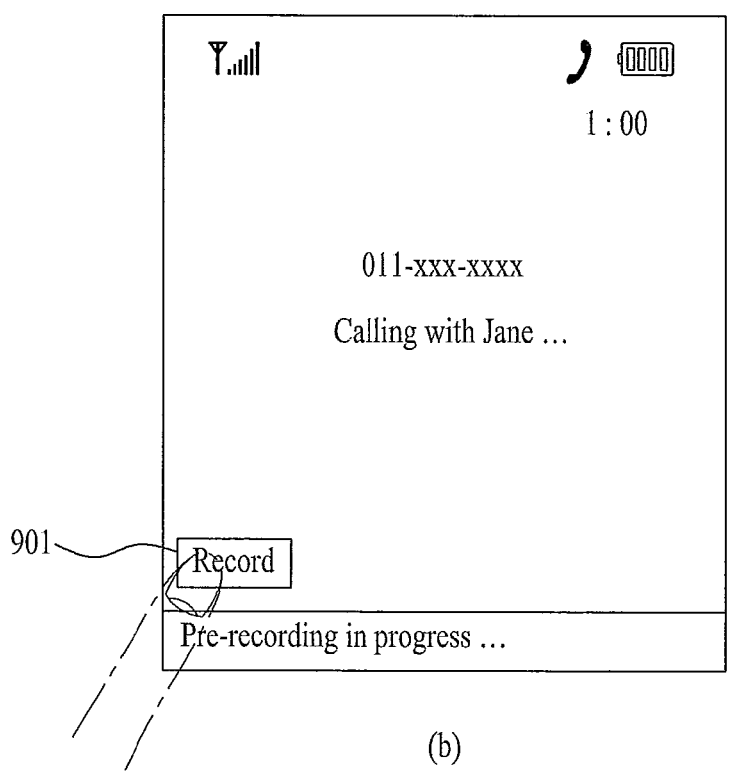
(b)

FIG. 10A
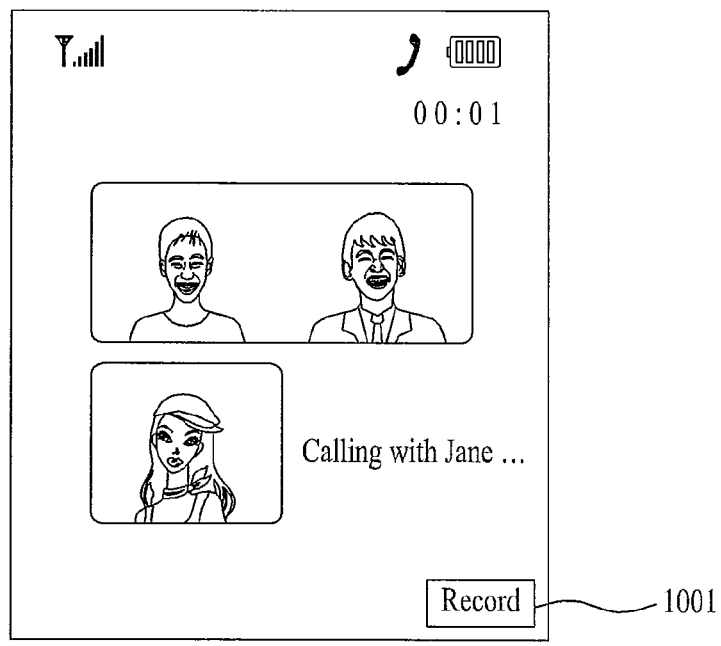
(a)
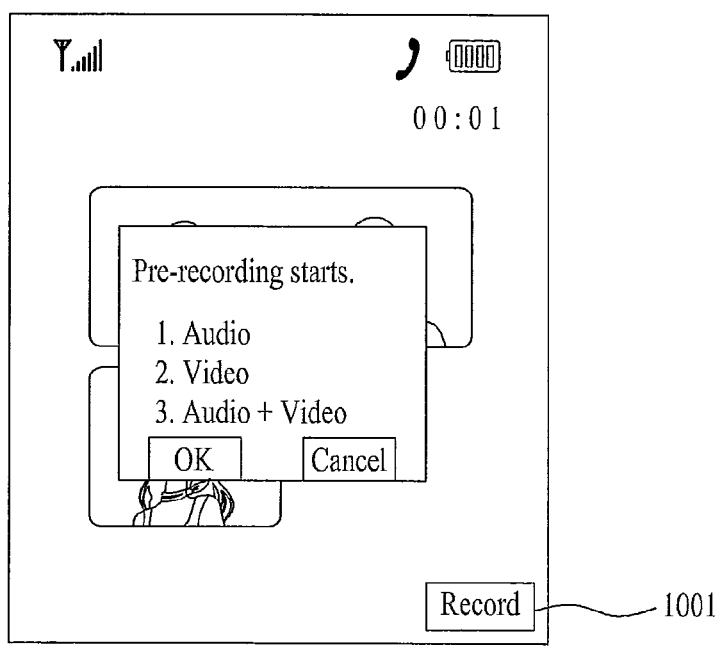
(b)

FIG. 10B
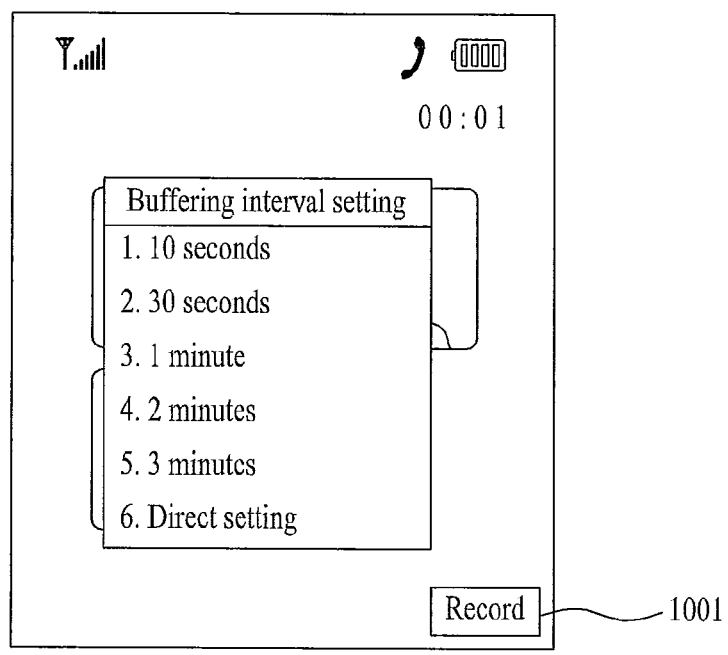
(a)
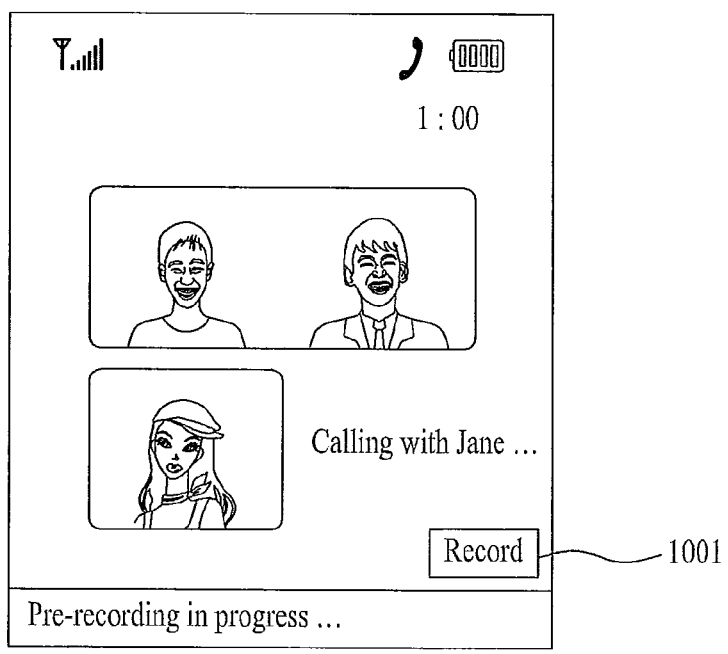
(b)

FIG. 12A
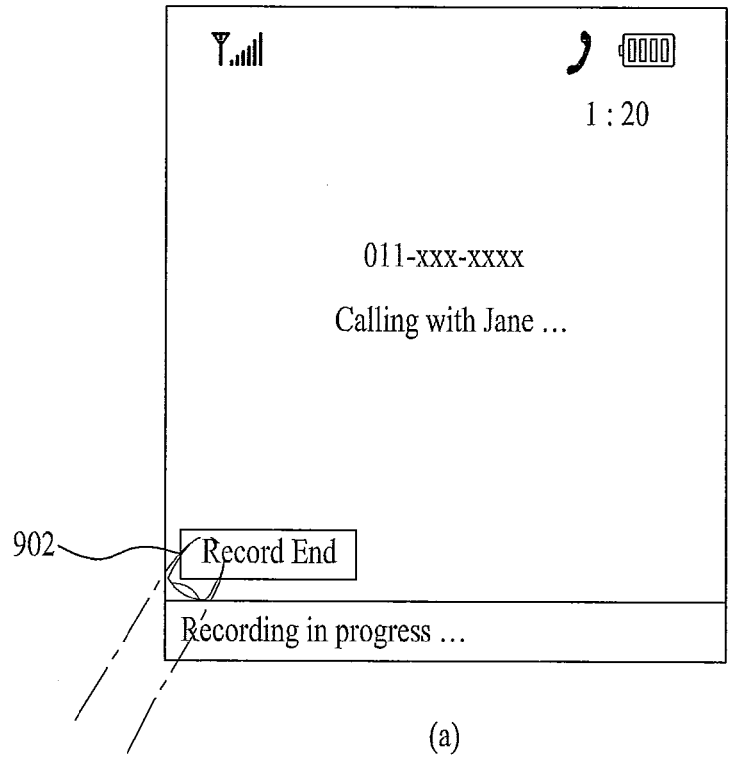
(a)
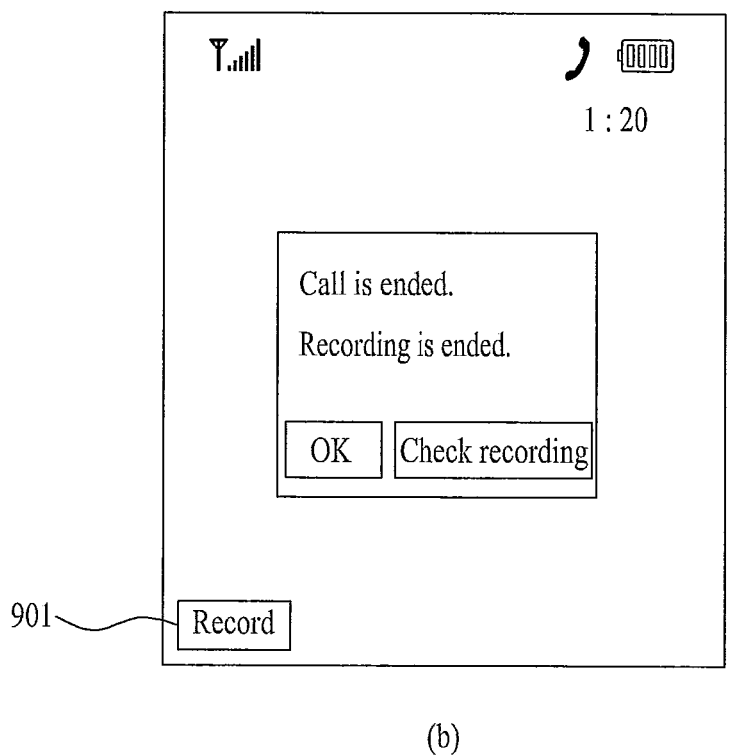
(b)

FIG. 12B
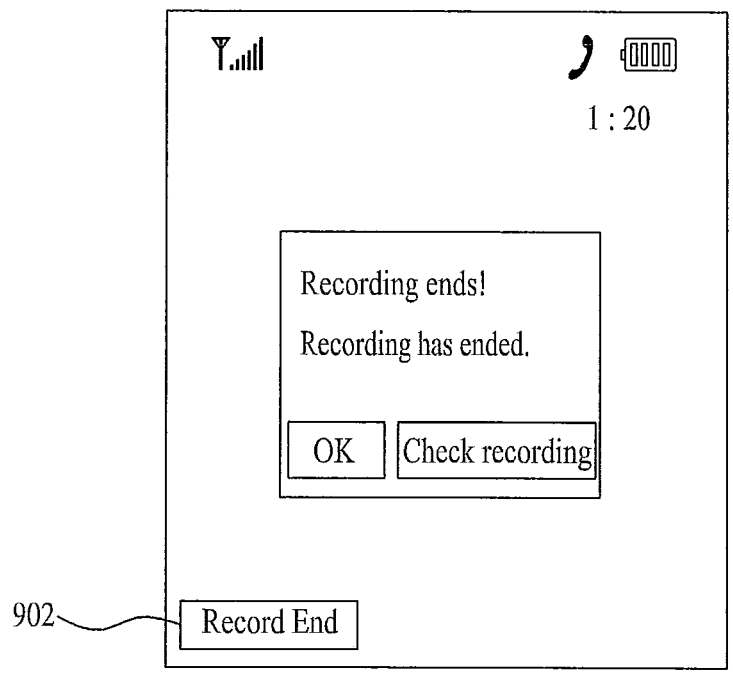
(a)
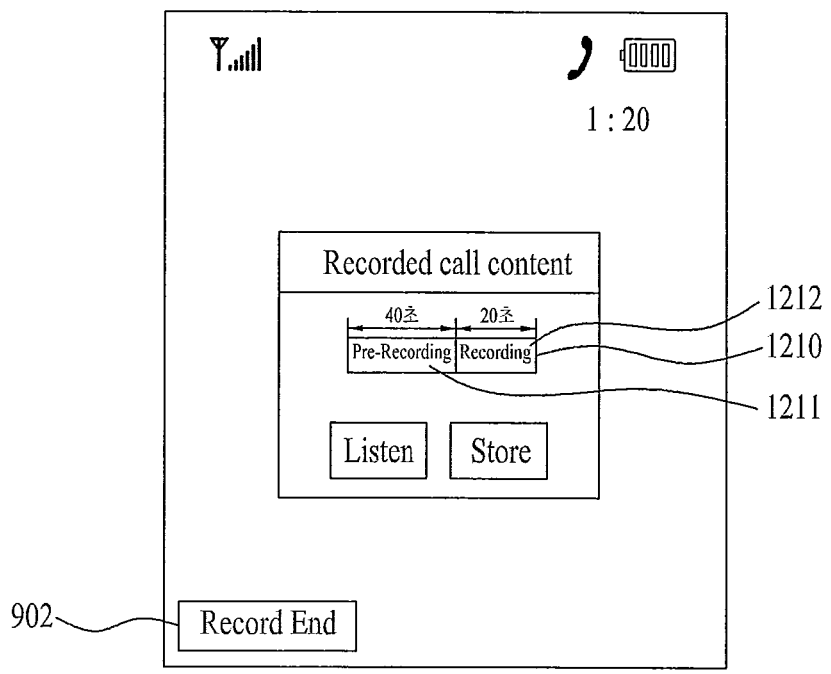
(b)

FIG. 13A
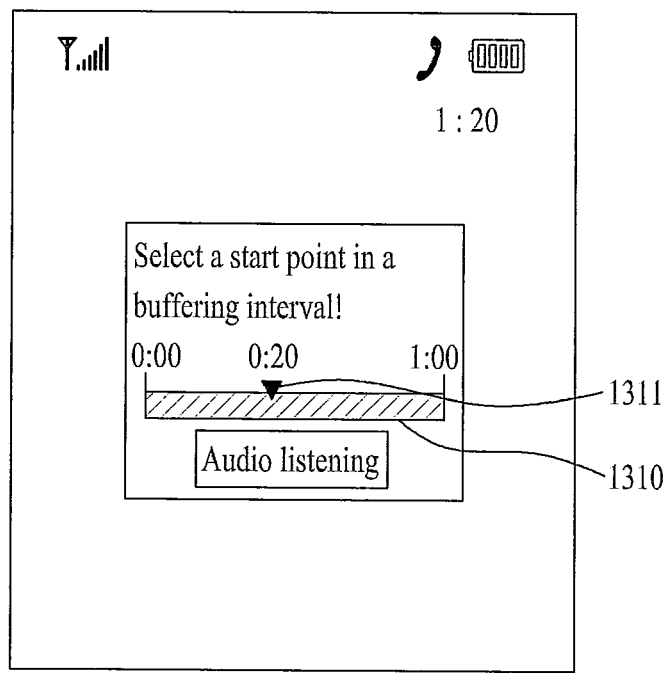
(a)
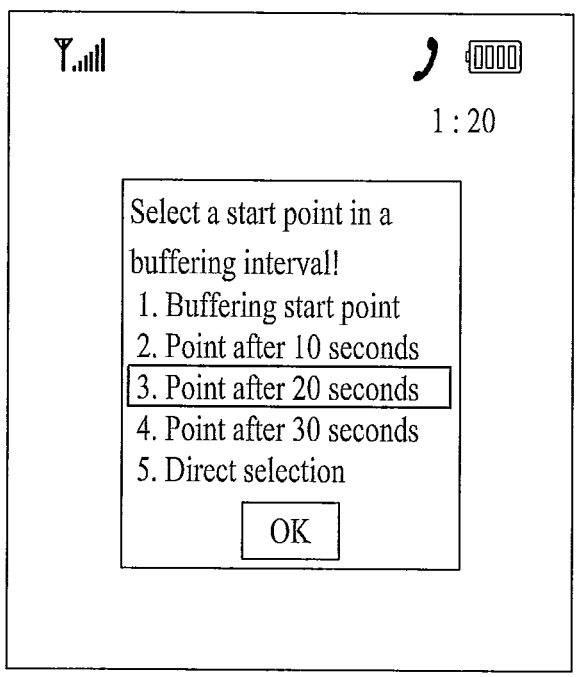
(b)

Video photographing environment setting

1. Pre-recording start point setting
2. Buffering interval setting
3. Others

Video photographing environment setting

1. Camera activation start point
2. User selection point
3. Specific object
4. Specific place

FIG. 16A
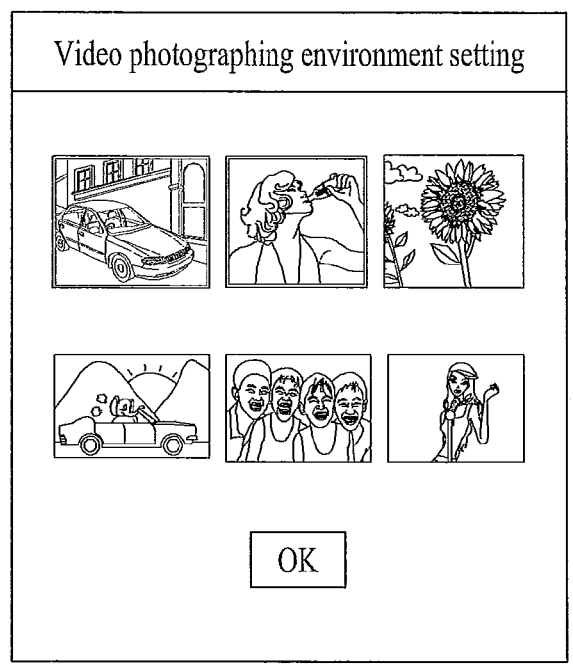
(a)
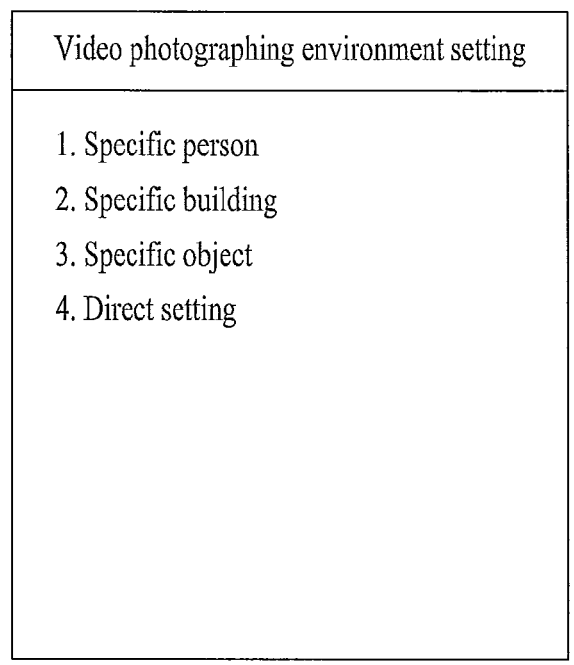
(b)

FIG. 17A
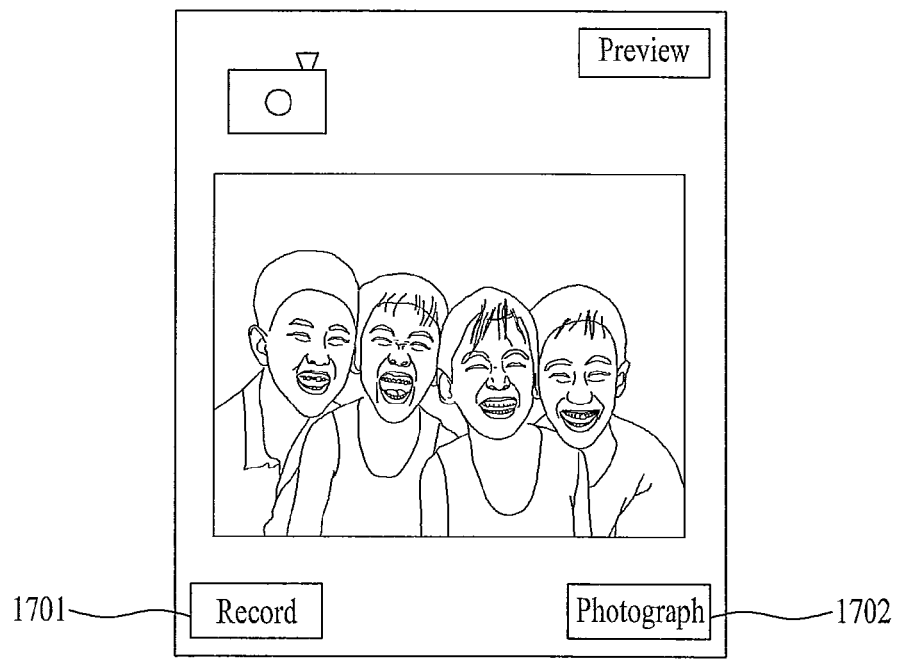
(a)
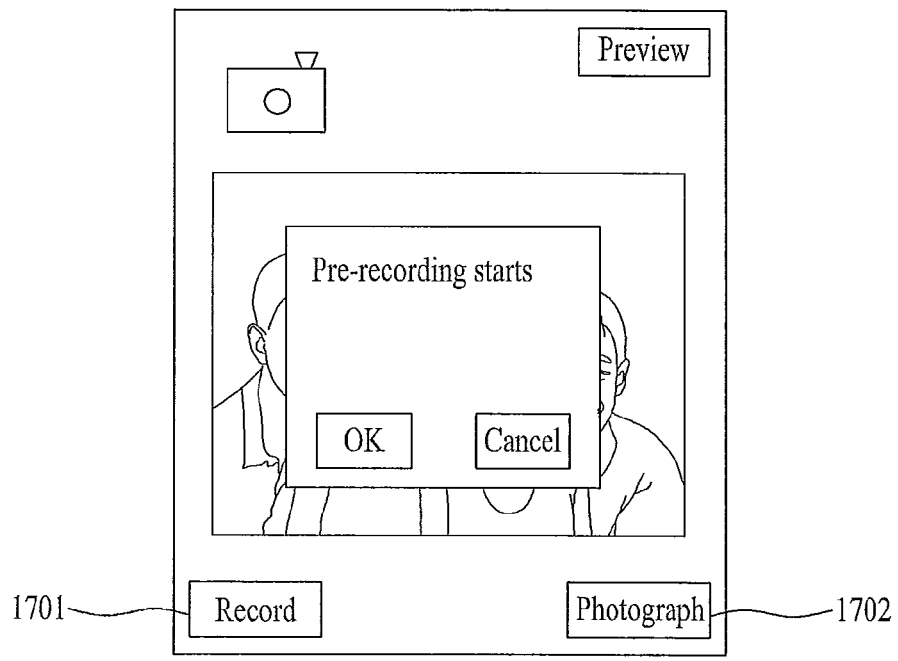
(b)

FIG. 17B
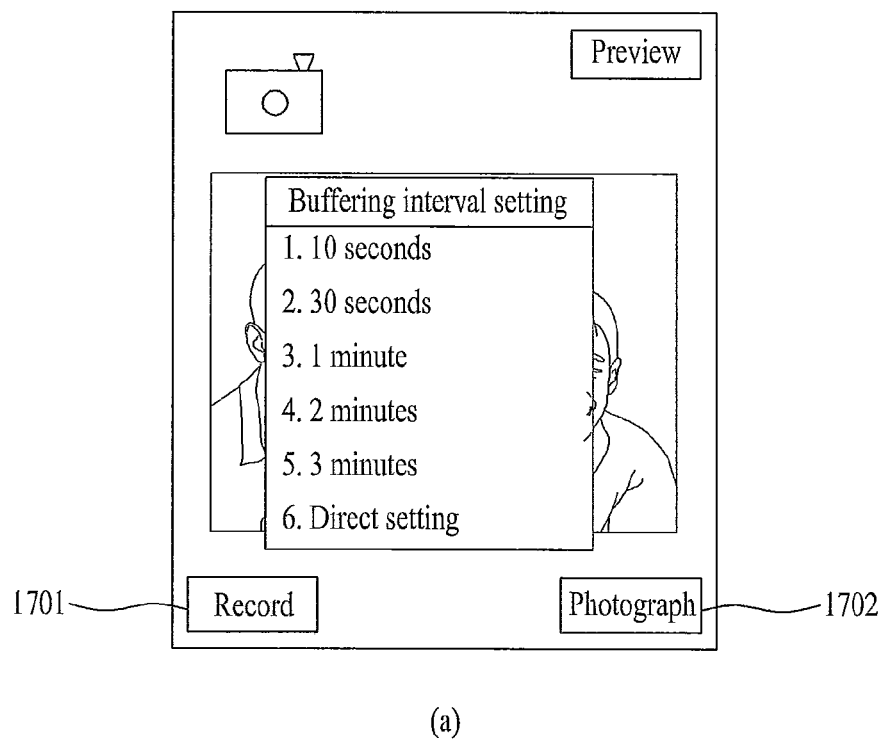
(a)
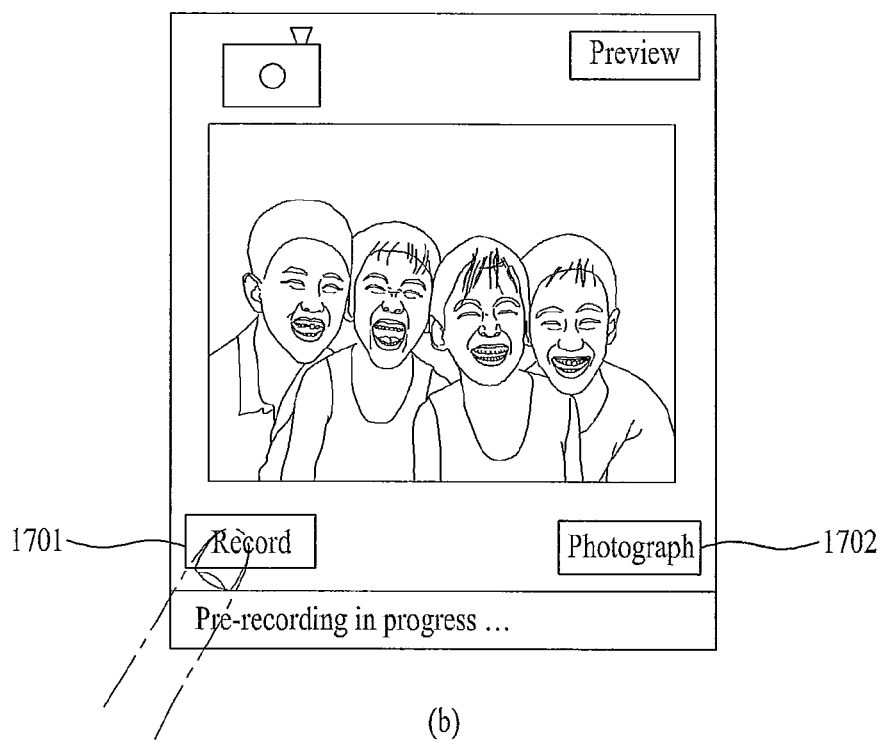
(b)

FIG. 19B
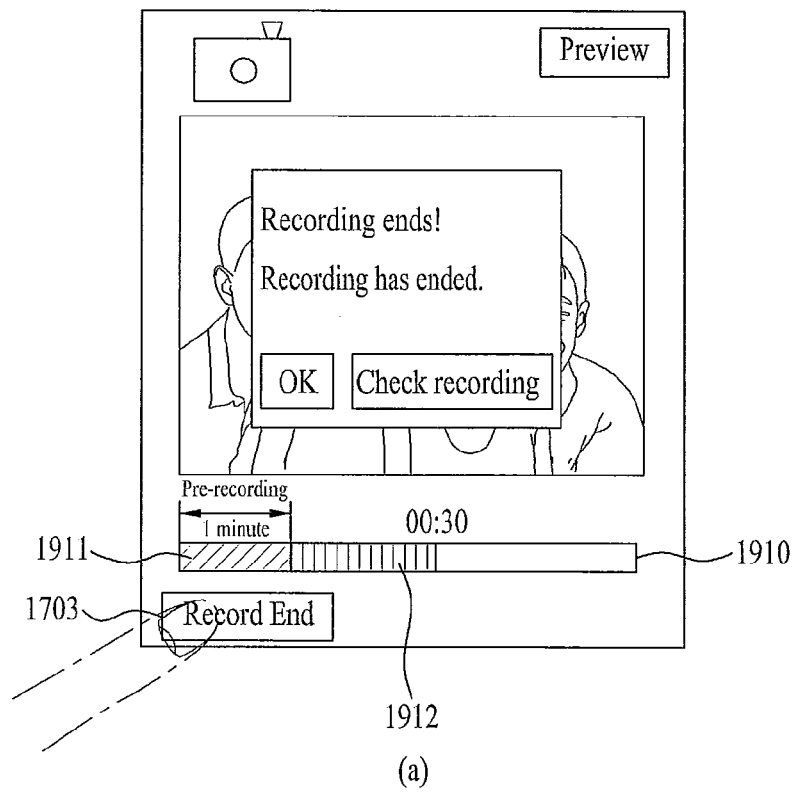
(a)
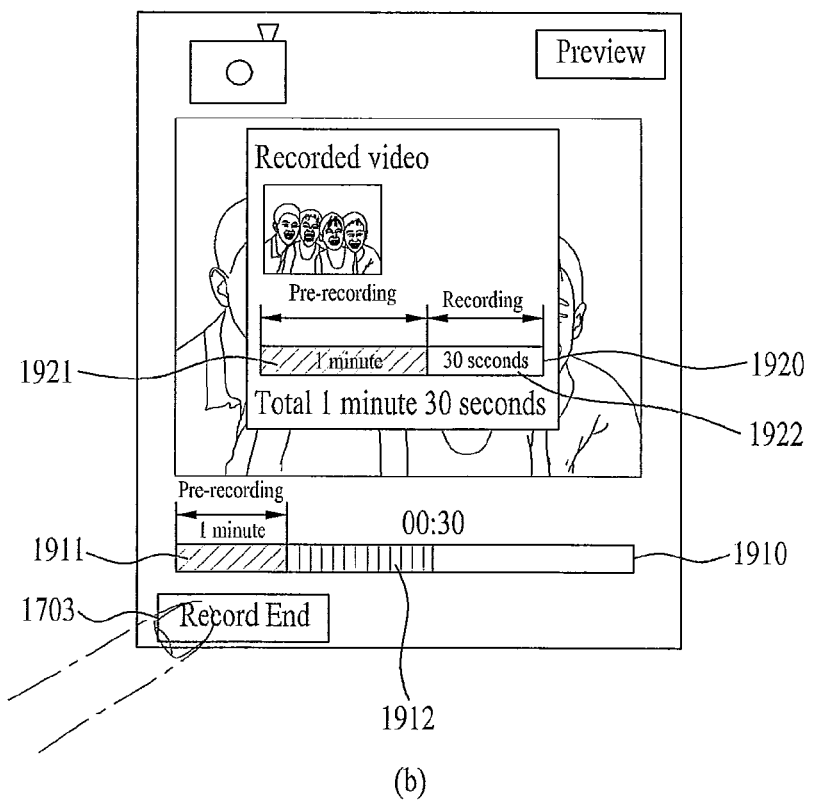
(b)

FIG. 20A
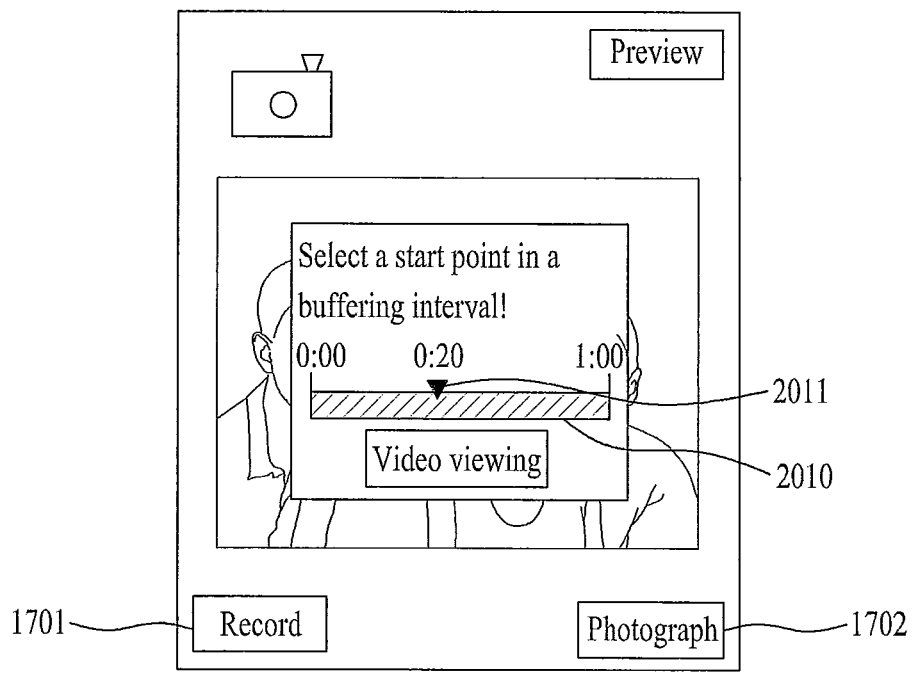
(a)
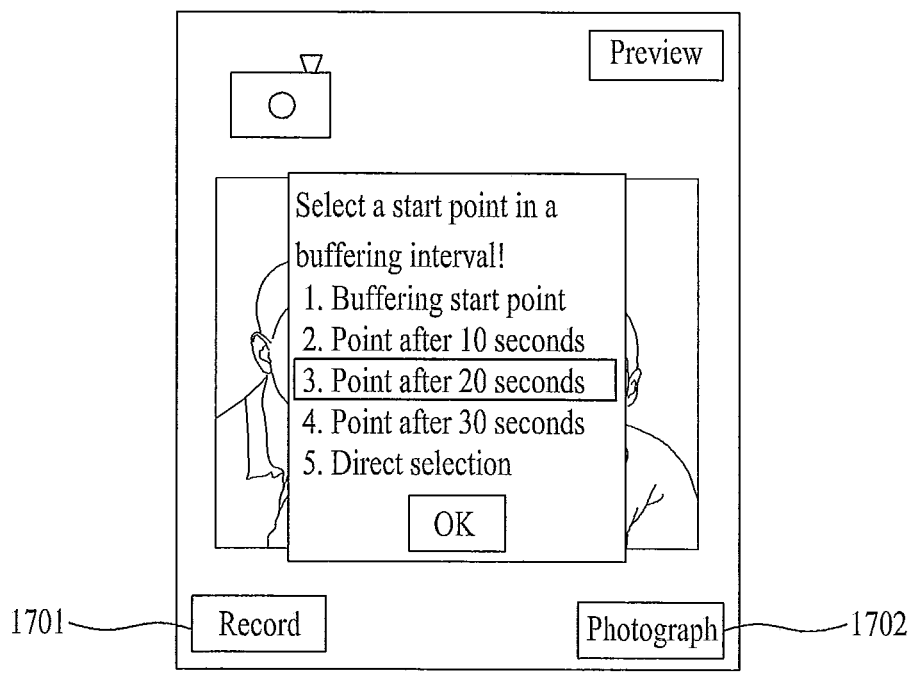
(b)

FIG. 20B
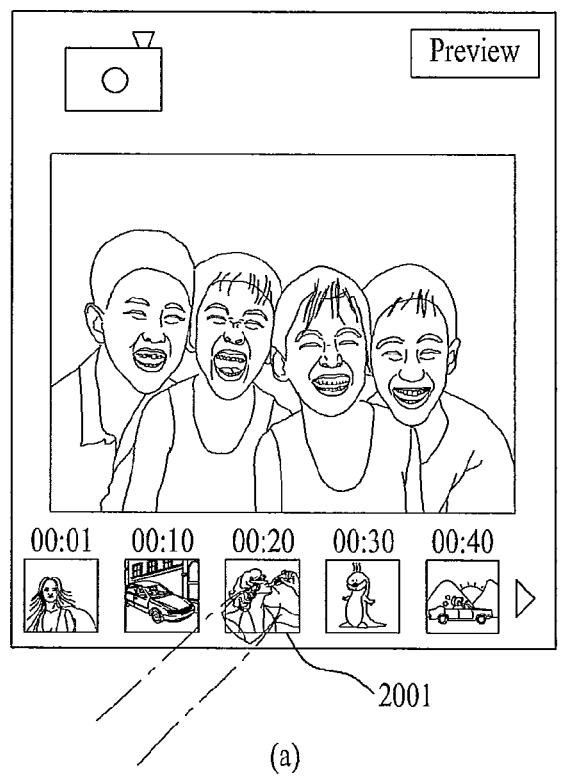
(a)
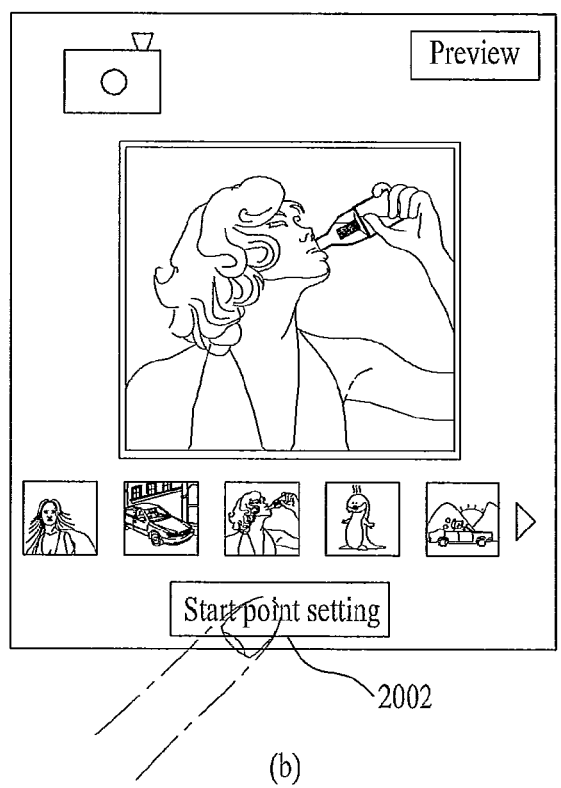
(b)

FIG. 22A

| Audio recording environment setting |
|---|
| 1. Pre-recording start point setting |
| 2. Buffering interval setting |
| 3. Others |
| OK |

FIG. 22B

| Audio recording environment setting |
|---|
| 1. 10 seconds |
| 2. 30 seconds |
| 3. 1 minute |
| 4. 2 minutes |
| 5. 3 minutes |
| 6. Direct setting |
| OK |

FIG. 26B
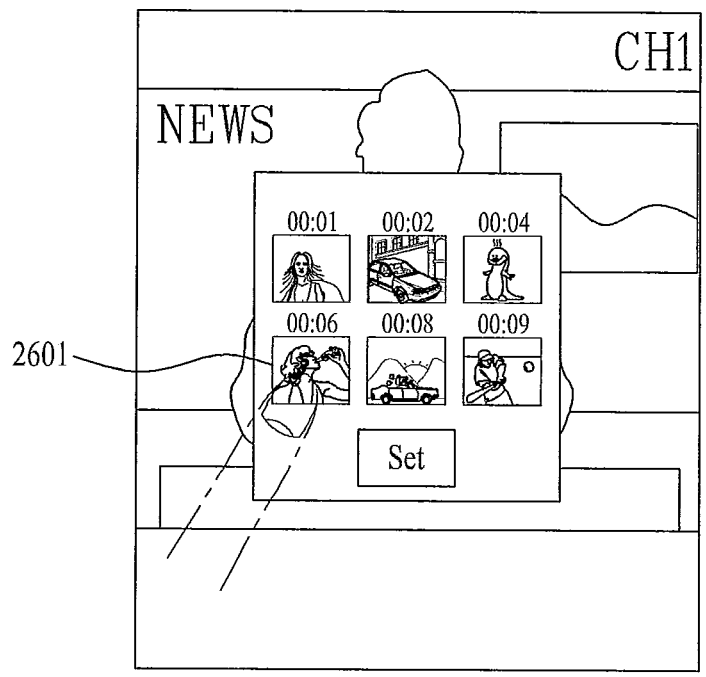
(a)
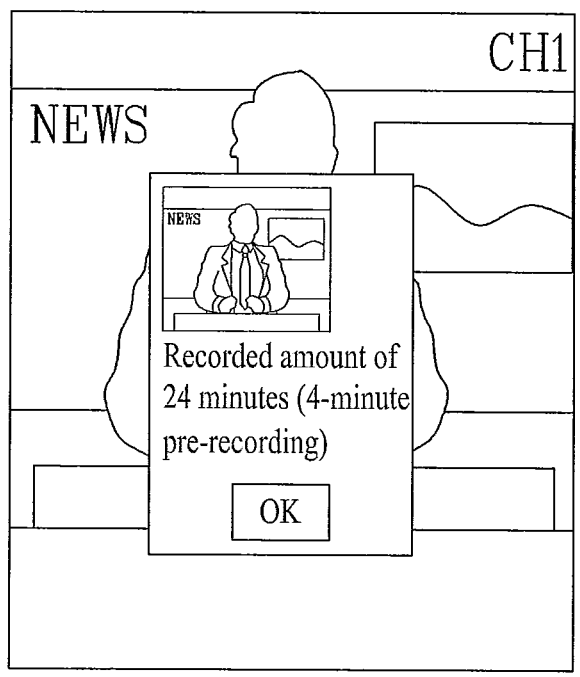
(b)

MOBILE TERMINAL AND GROUP CHAT CONTROLLING METHOD THEREOF

Pursuant to 35 U.S.C. §119(a), this application claims the benefit of earlier filing date and right of priority to Korean Application No. 10-2010-0050918, filed on May 31, 2010, the contents of which are hereby incorporated by reference herein in their entirety.

BACKGROUND OF THE INVENTION

1. Field of the Invention

The present invention relates to a mobile terminal, and more particularly, to a mobile terminal and recording controlling method thereof. Although the present invention is suitable for a wide scope of applications, it is particularly suitable for recording data in diverse situations including a voice call, a video call, a camera driving and the like.

2. Discussion of the Related Art

Generally, terminals can be classified into mobile/portable terminals and stationary terminals. The mobile terminals can be classified into handheld terminals and vehicle mount terminals again according to possibility of user's direct portability.

As functions of the terminal are diversified, the terminal is implemented as a multimedia player provided with composite functions such as photographing of photos or moving pictures, playback of music or moving picture files, game play, broadcast reception and the like for example.

To support and increase of the terminal functions, it may be able to consider the improvement of structural part and/or software part of the terminal.

A mobile terminal according to a related art is able to record a call content or video from a timing point of inputting an audio/video recording execution key from a user in the course of a call or a video input via a camera.

However, since a user frequently attempts to record a call content or video from a timing point before a timing point of inputting an audio/video recording executing key, the related art fails to meet such a demand made by the user.

SUMMARY OF THE INVENTION

Accordingly, the present invention is directed to a mobile terminal and recording controlling method thereof that substantially obviate one or more problems due to limitations and disadvantages of the related art.

An object of the present invention is to provide a mobile terminal and recording controlling method thereof, by which a call content can be recorded from a random timing point before a timing point of inputting a recording command signal from a user in a manner of performing a pre-recording ahead of a call content recording in performing a call.

Another object of the present invention is to provide a mobile terminal and recording controlling method thereof, by which a video can be recorded from a random timing point before a timing point of inputting a recording command signal from a user in a manner of performing a pre-recording ahead of a video recording in performing a video input via a camera.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes a wireless communication unit configured to perform a call with a counterpart terminal, a memory configured to buffer a call content of the performed call by a predetermined time unit, a user input unit configured to receive an input of a recording command signal for the performed call, and a controller, if receiving the input of the recording command signal, controlling to record the call content from an input point of the recording command signal by including the call content from a random point in a time interval corresponding to the call content buffered up to the input point of the recording command signal.

In another aspect of the present invention, a mobile terminal includes a camera configured to receive an input of a video externally, a memory configured to buffer the inputted video by a predetermined time unit, a user input unit configured to receive an input of a recording command signal for the inputted video, and a controller, if receiving the input of the recording command signal, controlling to record the video from an input point of the recording command signal by including the video from a random point in a time interval corresponding to the video buffered up to the input point of the recording command signal.

In another aspect of the present invention, a method of controlling a recording in a mobile terminal includes the steps of performing a call with a counterpart terminal, buffering a call content of the performed call by a predetermined time unit, receiving an input of a recording command signal for the performed call, and if receiving the input of the recording command signal, recording the call content from an input point of the recording command signal by including the call content from a random point in a time interval corresponding to the call content buffered up to the input point of the recording command signal.

In a further aspect of the present invention, a method of controlling a recording in a mobile terminal includes the steps of receiving an input of a video externally, buffering the inputted video by a predetermined time unit, receiving an input of a recording command signal for the inputted video, and if receiving the input of the recording command signal, recording the video from an input point of the recording command signal by including the video from a random point in a time interval corresponding to the video buffered up to the input point of the recording command signal.

Accordingly, the present invention provides the following effects and/or advantages.

First of all, since a pre-recording is performed prior to a call content recording in case of performing a call, it is able to record a call content from a random timing point prior to a timing point of inputting a recording command signal from a user.

Secondly, since a pre-recording is performed ahead of a video recording in performing a video input via a camera, a video can be recorded from a random timing point before a timing point of inputting a recording command signal from a user.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 3 is a flowchart for a method of controlling a call content recording in a mobile terminal according to one embodiment of the present invention;

FIG. 9A and FIG. 9B are diagrams of screen configurations for receiving an input of a recording command signal in the course of a voice call content buffering according to the present invention;

FIG. 10A and FIG. 10B are diagrams of screen configurations for receiving an input of a recording command signal in the course of a video call content buffering according to the present invention;

FIG. 12A and FIG. 12B are diagrams of screen configurations for receiving an input of a recording end command signal according to the present invention;

FIGS. 13A to 13C are diagrams of screen configurations for setting a recording start point in a buffering interval in case of a recording end according to the present invention;

FIGS. 15A to 16B are diagrams of screen configurations for setting a video recording environment according to the present invention;

FIG. 17A and FIG. 17B are diagrams of screen configurations for receiving an input of a recording command signal in the course of a video buffering according to the present invention;

FIG. 19A and FIG. 19B are diagrams of screen configurations for receiving an input of a recording end command signal according to the present invention;

FIGS. 20A to 20C are diagrams of screen configurations for setting a recording start point in a buffering interval in case of a recording end according to the present invention;

FIGS. 22A to 23C are diagrams of screen configurations for recording a audio using a pre-buffering in case of performing a audio recording according to the present invention;

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

First of all, mobile terminals described in this disclosure can include a mobile phone, a smart phone, a laptop computer, a digital broadcast terminal, a PDA (personal digital assistants), a PMP (portable multimedia player), a navigation system and the like.

Except a case applicable to a mobile terminal only, it is apparent to those skilled in the art that the configurations according to an embodiment described in this disclosure is applicable to such a stationary terminal as a digital TV, a desktop computer and the like.

Figure 1:
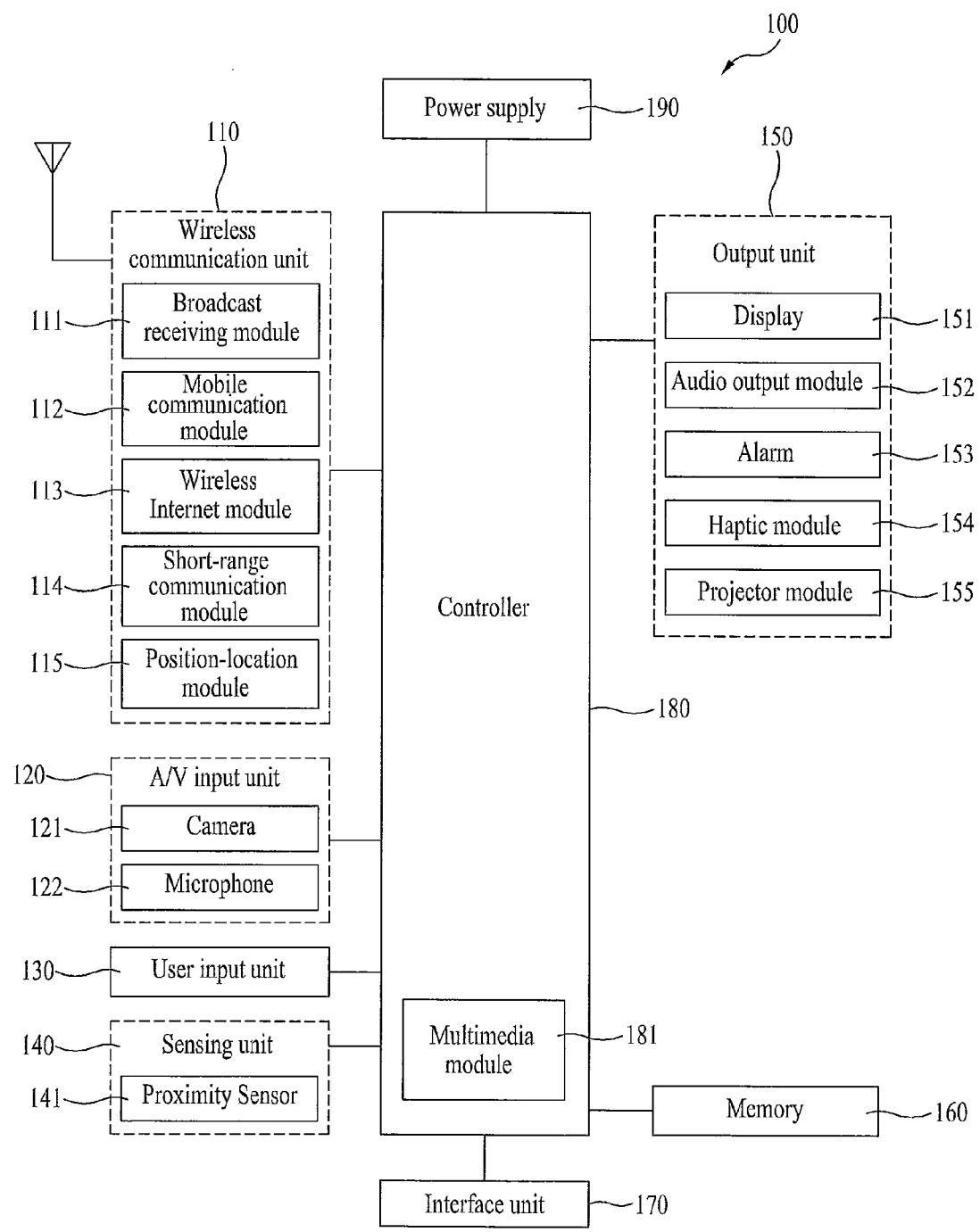
FIG. 1 is a block diagram of a mobile terminal according to one embodiment of the present invention.

FIG. 1 is a block diagram of a mobile terminal according to one embodiment of the present invention.

Referring to FIG. 1, a mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display unit 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display unit 151, an audio output module 152, an alarm unit 153, a haptic module 154 and the like.

The display unit 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display unit 151 may additionally or alternatively display images which are associated with these modes, the UI or the GUI.

The display unit 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display unit 151 can be implemented in the optical transmittive type as well. In this configuration, a user is able to see an object in rear of a terminal body via the area occupied by the display unit 151 of the terminal body.

At least two display units 151 can be provided to the mobile terminal 100 in accordance with the implemented configuration of the mobile terminal 100. For instance, a plurality of display units can be arranged on a single face of the mobile terminal 100 in a manner of being spaced apart from each other or being built in one body. Alternatively, a plurality of display units can be arranged on different faces of the mobile terminal 100.

In case that the display unit 151 and a sensor for detecting a touch action (hereinafter called 'touch sensor') configures a mutual layered structure (hereinafter called 'touchscreen'), it is able to use the display unit 151 as an input device as well as an output device. In this case, the touch sensor can be configured as a touch film, a touch sheet, a touchpad or the like.

The touch sensor can be configured to convert a pressure applied to a specific portion of the display unit 151 or a variation of a capacitance generated from a specific portion of the display unit 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display unit 151 is touched.

Referring to FIG. 1, a proximity sensor (not shown in the drawing) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

In the following description, for clarity, an action that a pointer approaches without contacting with the touchscreen to be recognized as located on the touchscreen is named 'proximity touch'. And, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display unit 151 or the audio output unit 152. Hence, the display unit 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2A:
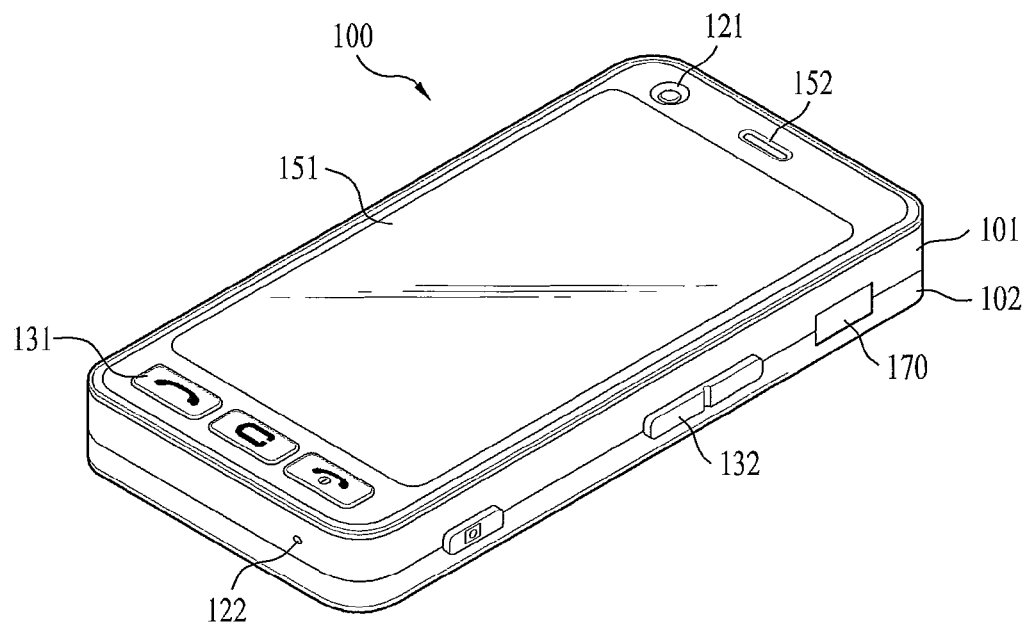
FIG. 2A is a front perspective diagram of a mobile terminal according to one embodiment of the present invention.

FIG. 2A is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2A, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display unit 151, an audio output unit 152, a camera 121, user input units 130/131 and 132, a microphone 122, an interface 180 and the like can be provided to the terminal body, and more particularly, to the front case 101.

The display unit 151 occupies most of a main face of the front case 101. The audio output unit 151 and the camera 121 are provided to an area adjacent to one of both end portions of the display unit 151, while the user input unit 131 and the microphone 122 are provided to another area adjacent to the other end portion of the display unit 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152, a command for a switching to a touch recognizing mode of the display unit 151 or the like can be inputted to the second manipulating unit 132.

Figure 2B:
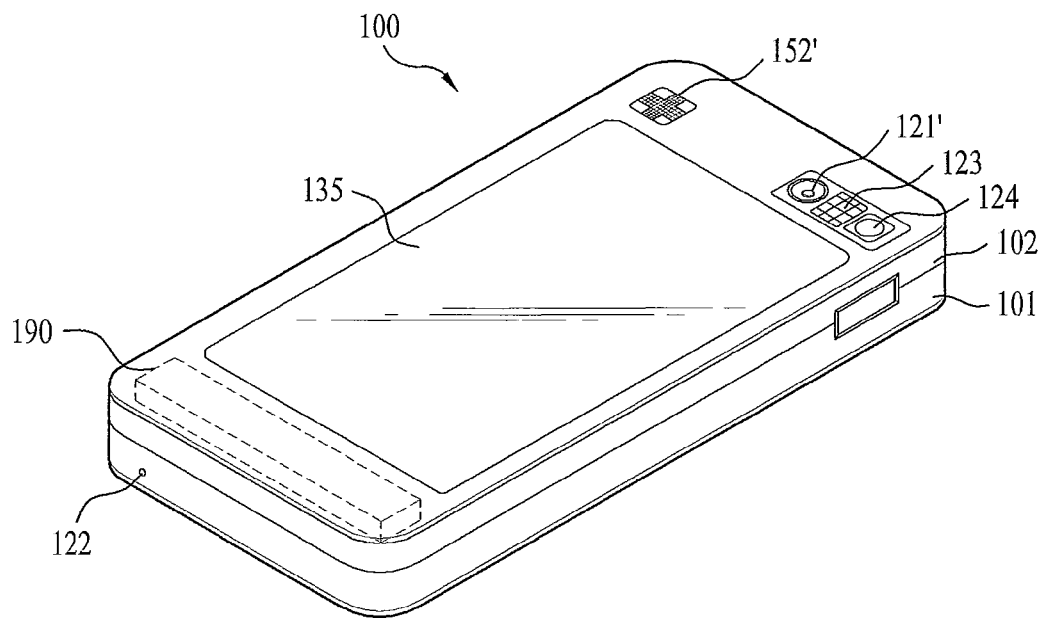
FIG. 2B is a rear perspective diagram of a mobile terminal according to one embodiment of the present invention.

FIG. 2B is a perspective diagram of a backside of the terminal shown in FIG. 2A.

Referring to FIG. 2B, a camera 121' can be additionally provided to a backside of the terminal body, and more particularly, to the rear case 102. The camera 121 has a photographing direction that is substantially opposite to that of the former camera 121 shown in FIG. 21A and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2A and may be used for implementation of a speakerphone mode in talking over the terminal.

A broadcast signal receiving antenna 124 can be additionally provided to the lateral side of the terminal body as well as an antenna for communication or the like. The antenna 124 constructing a portion of the broadcast receiving module 111 shown in FIG. 1 can be retractably provided to the terminal body.

A power supply unit 190 for supplying a power to the terminal 100 is provided to the terminal body. And, the power supply unit 190 can be configured to be built within the terminal body. Alternatively, the power supply unit 190 can be configured to be detachably connected to the terminal body.

A touchpad 135 for detecting a touch can be additionally provided to the rear case 102. The touchpad 135 can be configured in a light transmittive type like the display unit 151. In this case, if the display unit 151 is configured to output visual information from its both faces, it is able to recognize the visual information via the touchpad 135 as well. The information outputted from both of the faces can be entirely controlled by the touchpad 135. Alternatively, a display is further provided to the touchpad 135 so that a touchscreen can be provided to the rear case 102 as well.

The touchpad 135 is activated by interconnecting with the display unit 151 of the front case 101. The touchpad 135 can be provided in rear of the display unit 151 in parallel. The touchpad 135 can have a size equal to or smaller than that of the display unit 151.

First of all, a mobile terminal mentioned in the following description can include at least one of the components shown in FIG. 1.

In the following description, a method of controlling a recording according to the present invention is explained in a manner of being divided into a method of controlling a recording of a call content and a method of controlling a recording of a video or picture inputted via a camera.

First of all, a call content recording controlling method is explained with reference to the accompanying drawings as follows.

FIG. 3 is a flowchart for a method of controlling a call content recording in a mobile terminal according to one embodiment of the present invention.

Referring to FIG. 3, the mobile terminal 100 performs a call with a counterpart terminal using the wireless communication unit 110 under the control of the controller 180 [S310].

In this case, the call can include a voice call and a video call both. Moreover, the call can include both a case of receiving a call signal from a counterpart terminal (i.e., an incoming call) and a case of transmitting a call signal to a counterpart terminal (i.e., an outgoing call).

The mobile terminal 100 receives a setting of a predetermined time interval (hereinafter named a buffering interval) for buffering a call content of the performed call via the user input unit 130 [S320]. In this case, the setting step S320 can be performed prior to or in the course of the call performing step S310.

In this case, 'buffering the call content in the predetermined time interval' may mean that the call content is temporarily stored by a predetermined time unit. For instance, if the predetermined time interval amounts to 1 minute, the call content can be stored by 1-minute unit. The buffering of the call content can be named 'pre-recording' because it is performed ahead of a formal recording of the call content.

A user inputs a specific time interval as a buffering interval by manipulating the user input unit 130. The controller 180 is able to set the buffering interval to the inputted time interval.

In the setting step S320, the mobile terminal 100 is able to further set a recording environment of the call content according to a user action inputted via the user input unit 130 in addition to the buffering interval.

In the following description, the setting step S320 is explained in detail with reference to FIGS. 4A to 8.

FIGS. 4A to 8 are diagrams of screen configurations for setting a recording environment of a call content according to the present invention.

Figure 4A:
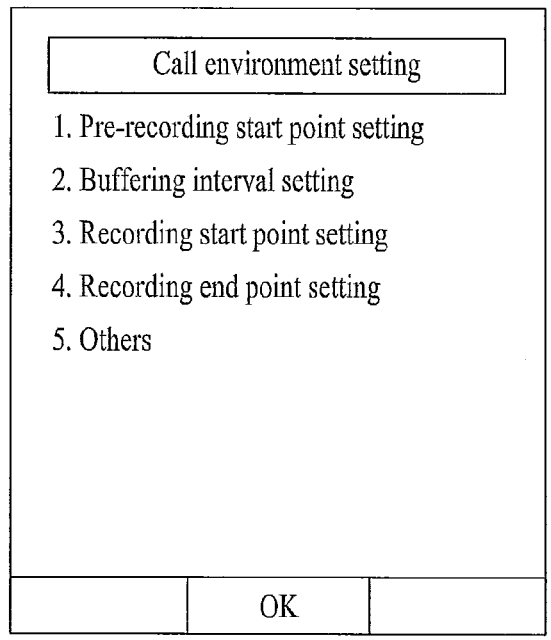
FIGS. 4A to 8 are diagrams of screen configurations for setting a recording environment of a call content according to the present invention.

Referring to FIG. 4A, if a user selects a menu item or a key (or a key region) related to a call environment setting, the mobile terminal 100 is able to display a menu configuration picture shown in FIG. 4A for example.

Figure 4B:
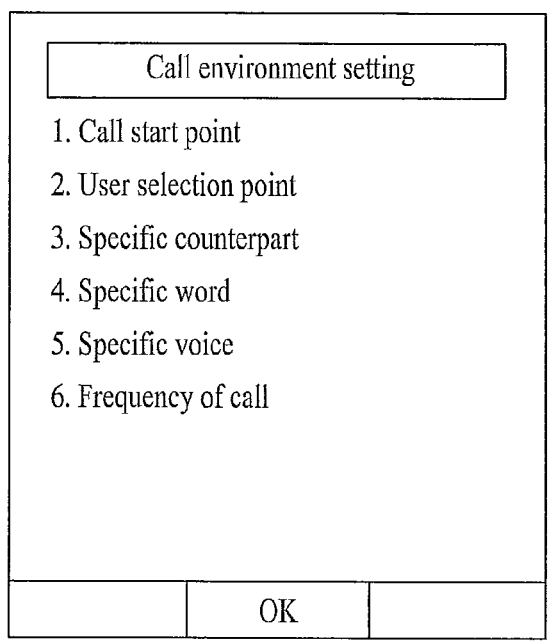

Referring to FIG. 4B, if a men item 'pre-recording start point setting' is selected in FIG. 4A, the mobile terminal 100 enters a mode for setting a buffering start point of a call content and is able to display a condition list of the buffering start point on a screen.

For instance, if a call start point is selected from the condition list, the mobile terminal 100 is able to buffer a call content from the beginning of the call. If a user selected point is selected from the condition list, the mobile terminal 100 is able to buffer a call content from a timing point of receiving an input of a command signal for a call content buffering from a user.

In the following description, cases of selecting the rest of the conditions from the condition list are explained in detail.

Figure 5A:
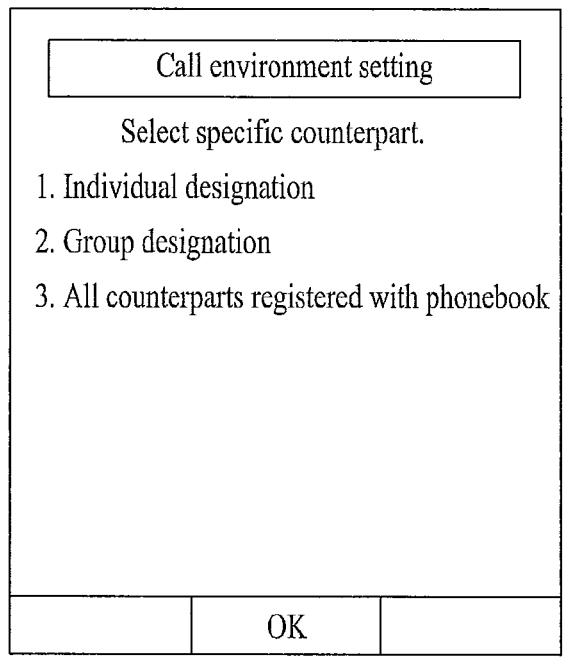
Figure 5B:
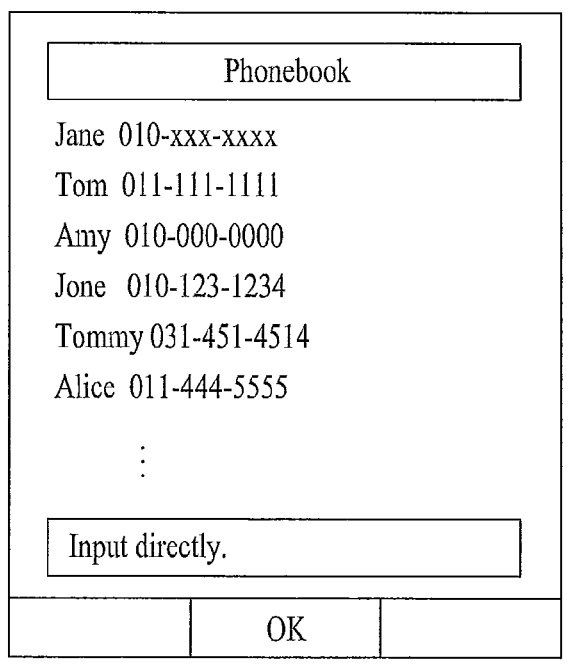
Figure 5C:
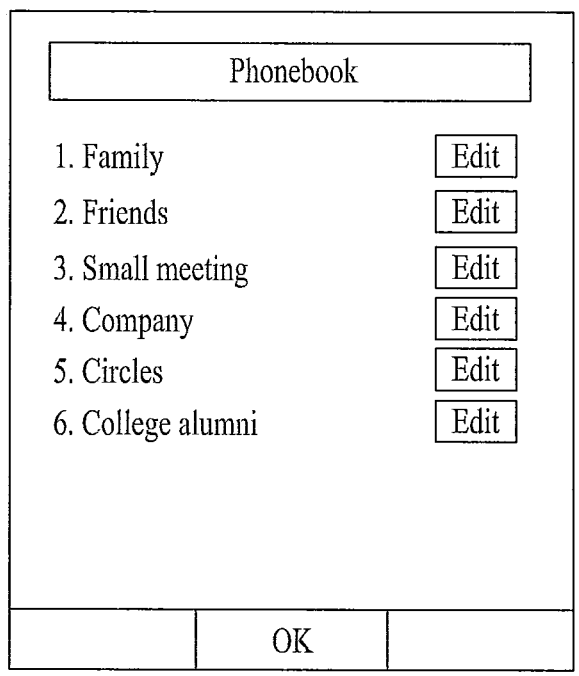

FIGS. 5A to 5C show screen configurations for a case of selecting a specific counterpart from the condition list shown in FIG. 4B.

Referring to FIG. 5A, the mobile terminal 100 enables a user to select whether to designate a specific counterpart individually (i.e., individual designation), whether to designate a specific counterpart per group (i.e., group designation with reference to a group registered with a phonebook), or whether to designate all counterparts registered with a phonebook as specific counterparts (i.e., all phonebook registered counterparts).

Referring to FIG. 5B, if the individual designation is selected in FIG. 5A, the mobile terminal 100 displays a counterpart list including counterparts registered with a phonebook and is then able to select the counterpart selected from the counterpart list by a user as a specific counterpart. Therefore, in case of a making a call with the selected counterpart, the mobile terminal 100 is able to buffer a call content from a call start point.

Of course, the specific counterpart can include a terminal corresponding to a phone number directly inputted by a user as well as a counterpart registered with the phonebook.

Referring to FIG. 5C, if the group designation is selected in FIG. 5A, the mobile terminal 100 displays a group list including groups registered with a phonebook and is then able to select counterpart(s) belonging to the group selected from the group list by a user as specific counterpart(s). In this case, each of the groups includes at least one or more counterparts). Therefore, in case of making a call with the counterpart(s) belonging to the selected group, the mobile terminal 100 is able to buffer call contents from a call start point.

Figure 6A:
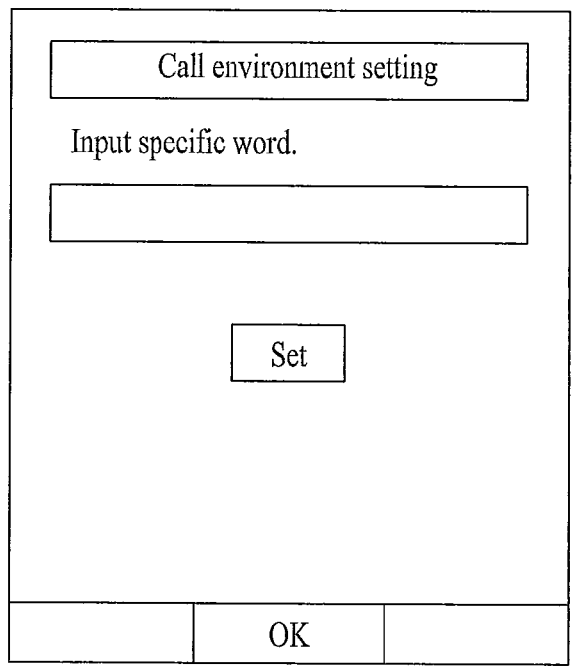
Figure 6B:
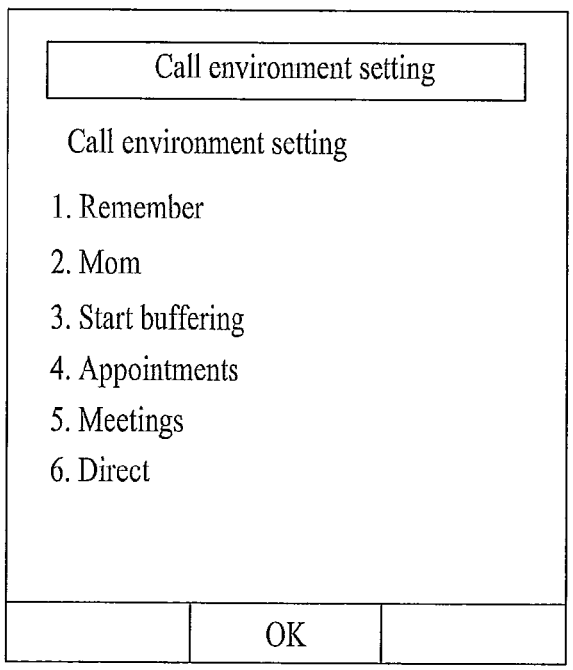

FIG. 6A and FIG. 6B show screen configurations in case that a specific word is selected from the condition list shown in FIG. 4B.

Referring to FIG. 6A, the mobile terminal 100 displays a picture including a word input window for receiving an input of a specific word and is then able to set a word inputted via the word input window to a specific word. Therefore, in case of determining that the word inputted via the word input window is included in a call content, the mobile terminal 100 is able to buffer the call content from a point of making the determination.

Referring to FIG. 6B, the mobile terminal 100 displays a word list including words settable to specific words and is then able to set the word selected from the word list to a specific word. Therefore, in case of determining that the word selected from the word list is included in a call content, the mobile terminal 100 is able to buffer the call content from a point of making the determination.

Moreover, in case that the set specific word is related to a specific place or a specific time (e.g., date, hour, day of the week, etc.), when a call content including the set specific word is recorded (This will be explained later), the mobile terminal 100 is able to store the recorded call content in a manner of linking the corresponding call content to a schedule management application.

Figure 7A:
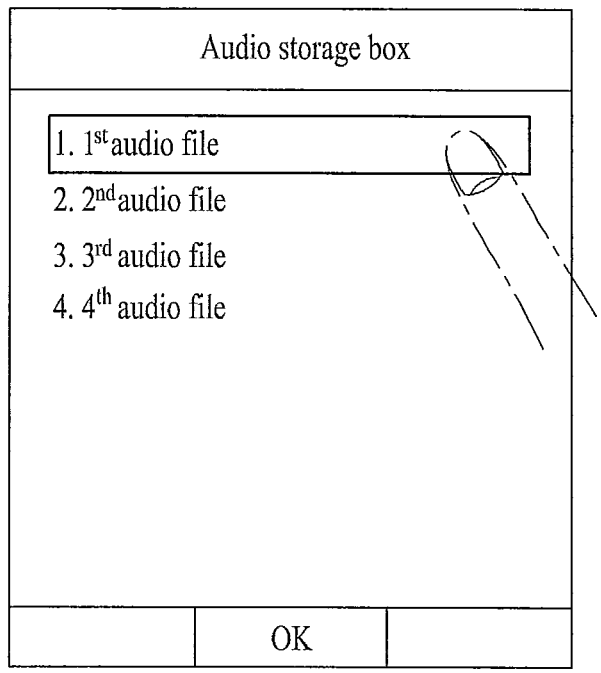
Figure 7B:
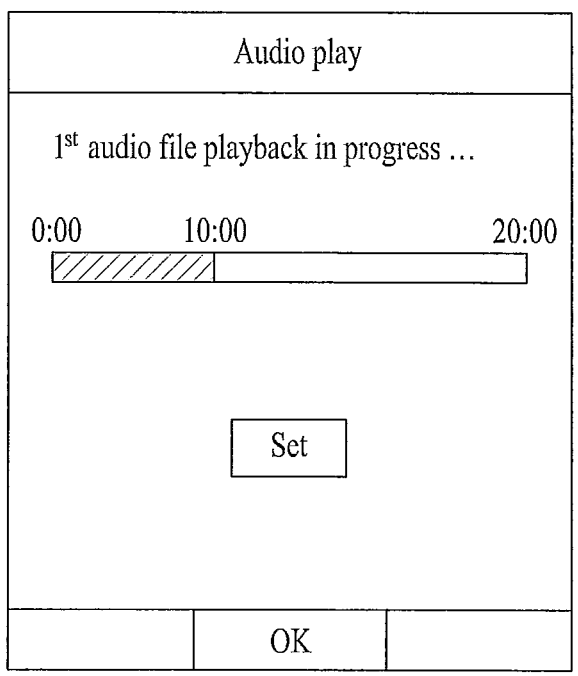
Figures 7C, 8:
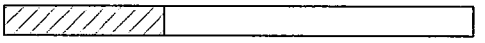

FIGS. 7A to 7C show screen configurations in case that a specific audio is selected from the condition list shown in FIG. 4B.

Referring to FIG. 7A and FIG. 7B, the mobile terminal 100 displays an audio file list including previously stored audio files and is then able to play an audio file selected from the audio file list. And, the mobile terminal 100 is able to set a specific audio to an audio included in the selected audio file (without playback) or the played audio file. Therefore, in case of detecting the audio included in the selected or played audio file from a call content, the mobile terminal 100 is able to buffer the call content from a point of the detection.

Referring to FIG. 7C, the mobile terminal 100 sets a state for receiving an input of audio externally, is then receives an input of an audio externally, and is then able to set a specific audio to the inputted audio. Therefore, in case of detecting the inputted audio from a call content, the mobile terminal 100 is able to buffer the call content from a point of the detection.

FIG. 8 shows a screen configuration in case that a call frequency is selected from the condition list shown in FIG. 4B.

Referring to FIG. 8, the mobile terminal 100 displays a call frequency list and is then able to receive a selection of a specific call frequency from the displayed call frequency list. Therefore, in case of making a call with a counterpart belonging to the selected specific call frequency, the mobile terminal 100 is able to buffer a call content from a call start point.

Figure 4C:
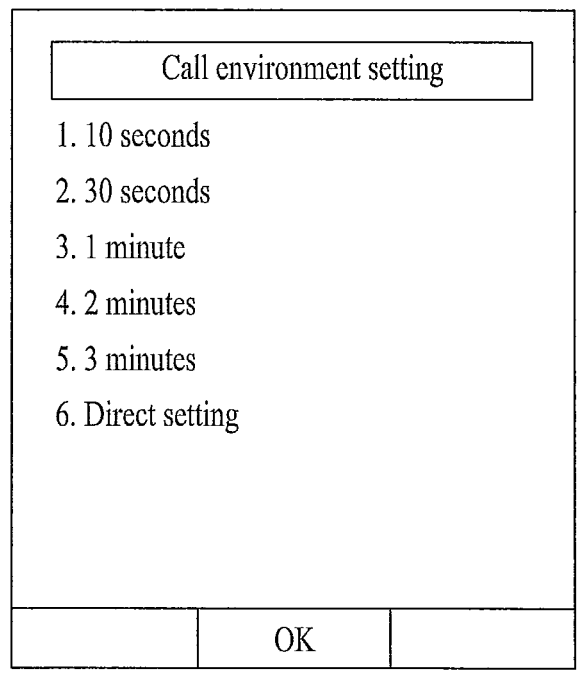

Referring now to FIG. 4A, if a menu item 'buffering interval setting' is selected in FIG. 4A, the mobile terminal 100 is able to display an interval list including settable buffering intervals [FIG. 4C].

For instance, if '10 seconds' is selected from the interval list, the mobile terminal 100 is able to buffer a call content by a 10-second unit. If '1 minute' is selected, the mobile terminal 100 is able to buffer a call content by a 1-minute unit. If 'direct setting' is selected from the interval list, the mobile terminal 100 is able to buffer a call content by an interval unit directly inputted by a user.

Referring now to FIG. 3, the mobile terminal 100 buffers a call content of the performed call in the memory by a buffering interval unit set in the setting step S320 under the control of the controller 180 [S330].

The buffering step S330 can be performed in at least one of a case that a currently connected counterpart terminal is a previously designated specific counterpart terminal (cf. FIGS. 5A to 5C), a case that a specific word is included in a call content (cf. FIG. 6A and FIG. 6B), a case that an audio of the call content is a voice of a specific person (cf. FIGS. 7A to 7C), a case that a frequency of call with the counterpart terminal is equal to or greater than a predetermined reference (cf. FIG. 8), and a case that a buffering command signal of the call content is inputted.

In particular, regarding the case of receiving the input of the buffering command signal, if a user selects a menu item or a key (or a key region) for receiving an input of a buffering command signal, the mobile terminal 100 is able to receive the buffering command signal. Alternatively, the case of receiving the input of the buffering command signal can include a case that a terminal action (e.g., shaking, inclining at a predetermined angle in predetermined direction, etc.) corresponding to a buffering signal is performed.

In the course of performing the buffering step S330, the mobile terminal 100 receives a recording command signal for the performed call via the user input unit 130 [S340].

In this case, the recording command signal can include a command signal for recording the audio or video of the call content of the performed call. The recording command signal can be inputted if a menu item or a key (or a key region) corresponding to a recording command is selected by a user or a terminal action (e.g., shaking, inclining, etc.) corresponding to the recording command is inputted.

The recording command signal inputting step S340 is explained in detail with reference to FIGS. 9A to 10B as follows.

FIG. 9A and FIG. 9B are diagrams of screen configurations for receiving an input of a recording command signal in the course of a voice call content buffering according to the present invention.

Referring to FIG. 9A, the mobile terminal 100 is able to output a text indicating that a pre-recording is performed in case of performing the pre-recording in the course of a voice call. For instance, if 'O.K.' is selected in FIG. 9A, the mobile terminal 100 performs a pre-recording. If 'Cancel' is selected in FIG. 9A, the mobile terminal 100 may not perform the pre-recording.

Referring to 9B (a), in case of performing a pre-recording in the course of a voice call, the mobile terminal 100 receives an input of a buffering interval from a user and is then able to set an interval for buffering a call content to the inputted buffering interval.

For instance, in case of performing a pre-recording, the mobile terminal 100 displays an interval list including settable buffering intervals on a screen and is then able to set a buffering interval to the interval selected from the displayed interval list.

Referring to FIG. 9B (b), if a user selects a recording command key 901 provided to a screen in the course of performing a pre-recording by a unit of the above-set buffering interval, the mobile terminal 100 is able to receive an input of a recording command signal.

FIG. 10A and FIG. 10B are diagrams of screen configurations for receiving an input of a recording command signal in the course of a video call content buffering according to the present invention.

Referring to FIG. 10A, in case of performing a pre-recording in the course of a video call, the mobile terminal 100 outputs a text indicating that the pre-recording is performed and enables a user to select a recording target data.

For instance, if 'audio' is selected, the mobile terminal 100 is able to set a pre-recording target to an audio in a video call content only. If 'video' is selected, the mobile terminal is able to set a pre-recording target to a video in a video call content only. If 'audio+video' is selected, the mobile terminal 100 is able to set pre-recording targets to both audio and video in a video call content.

Referring to FIG. 10B, in case of performing a pre-recording in the course of a video call, the mobile terminal 100 sets an interval for buffering a call content to a buffering interval inputted by a user [a]. While the pre-recording is performed by a unit of the above-set buffering interval, if a user selects a recording command key 1001 provided to a screen, the mobile terminal 100 is able to receive an input of a recording command signal.

Referring now to FIG. 3, in case of receiving the input of the recording command signal in the inputting step S340, the mobile terminal 100 records the call content of the performed call under the control of the controller 180 [S350]. In the case the recorded call content can be stored in the memory 160.

In the recording step S350, the mobile terminal 100 is able to record the call content from the input point of the recording command signal by including the call content from a random point in the time interval corresponding to the buffered call content under the control of the controller 180.

In particular, although the mobile terminal 100 performs a recording operation from the input point of the recording command signal, the recorded call content may include a call content not from the input point of the recording command signal but from the random point in the buffered call content.

For instance, the random point in the time interval corresponding to the buffered call content can include a start point of a prescribed intermediate point of the call content buffered so far.

In the following description, the random point in the time interval corresponding to the buffered call content shall be named a recording start point. This is because the recording of the call content substantially starts with the random point.

The setting of the recording start point is explained in detail with reference to FIG. 11A and FIG. 11B as follows.

Figure 11A:
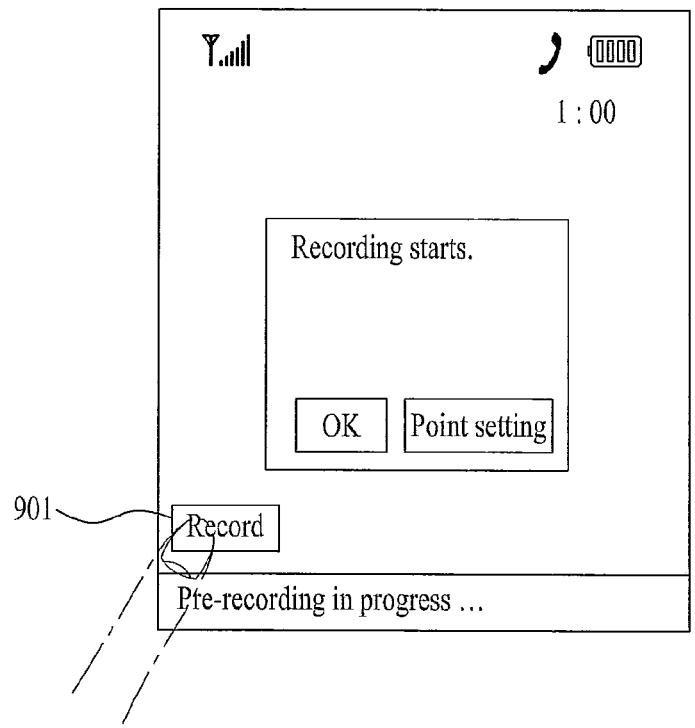
FIG. 11A and FIG. 11B are diagrams of screen configurations for setting a recording start point in a buffering interval in case of receiving an input of a recording command signal in the course of a voice call content buffering according to the present invention.

Referring to FIG. 11A, in case of receiving a recording command signal, the mobile terminal 100 is able to output a text announcing that a call content is going to be recorded.

For instance, if 'O.K.' is selected in FIG. 11A, the mobile terminal 100 is able to record a call content. If 'point setting' is selected in FIG. 11A, the mobile terminal 100 is able to display a picture for setting a recoding start point (hereinafter called a point setting picture).

Figure 11B:
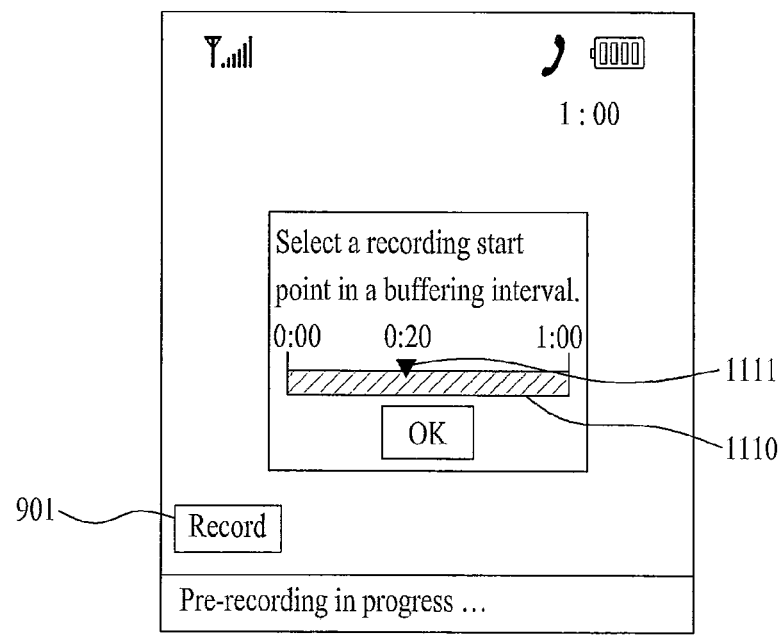

Referring to FIG. 11B, an indicator 1110 corresponding to a whole time of a call content buffered so far is displayed on a point setting picture. And, a pointer 1111 pointing out a specific point of the displayed indicator 1110 can be displayed.

Therefore, a user is able to set a recording start point to a point at which the pointer 1111 is located in a manner of locating the pointer 1111 at a specific point of the indicator 1110.

Meanwhile, the mobile terminal 100 displays a point list including points settable as recording start points on a screen and is then able to set a recording point to the point selected from the point list [not shown in the drawing].

Moreover, the mobile terminal 100 is able to help a user to select a recording start point in a manner of outputting a call content corresponding to a point, at which the pointer 1111 is located prior to the setting of the recording start point, or a call content corresponding to the point selected from the point list.

Therefore, the mobile terminal 100 is able to record a call content starting with the above-set recording start point (i.e., a random point in a buffering interval).

Referring now to FIG. 3, in case of receiving an input of the recording command signal, the mobile terminal 100 controls the memory 160 to interrupt the call content buffering operation 5330 under the control of the controller 180 and is able to delete the call content behind the recording start point in the buffered call content from the memory 160.

The mobile terminal 100 receives an input of a recording end command signal in the course of performing the recording step S350 [S360] and is then able to end the recording step S350 under the control of the controller 180 S370].

In this case, the recording end command signal can include a signal for recording audio/video of an performed call content.

The recording end command signal can be inputted if a menu item or a key (or a key region) corresponding to a recording end is selected by a user or a terminal action corresponding to the recording end is inputted. Furthermore, the recording end command signal can be inputted if the performed call is ended (e.g., a case that the performed call is ended by a user terminal or a counterpart terminal).

The input of the recording end command signal is explained in detail with reference to FIG. 12A and FIG. 12B as follows.

FIG. 12A and FIG. 12B are diagrams of screen configurations for receiving an input of a recording end command signal according to the present invention.

Referring to FIG. 12A (a), in case that a user selects a recording end key 902 provided to a screen in the course of recording a call content, the mobile terminal 100 is able to receive an input of a recording end command signal. In this case, the recording end key 902 is the same as the recording command key 901 and plays a different key function according to whether a recording is in progress. For instance, this key plays a role as the recording command key 901 before the recording or can play a role as the recording end command key 902.

Referring to FIG. 12A (b), in case that a call is ended, the mobile terminal 100 automatically receives an input of a recording end command key and is then able to output a text announcing that the call and the recording are ended to the screen.

Referring to FIG. 12A (b) or FIG. 12B (a), in case of ending a recording operation, the mobile terminal 100 enables a user to select whether to check recording information on the recorded call content.

Referring to FIG. 12B (b), if 'check recording' is selected in FIG. 12A (b) or FIG. 12B (a), the mobile terminal 100 displays an indicator 1210 indicating a total time (e.g., 1 minute) corresponding to the recorded call content and is also able to display a recording time (i.e., 40 seconds) 1211 of a pre-recording part 1211 and a recording time (i.e., 20 seconds) 1212 of a normal recording part 1212 within the indicator 1210.

In this case, the pre-recording part 1211 includes a call content part ranging between a recording start point and a recording command signal input point, while the normal recording part 1212 includes a call content part ranging between the recording command signal input point and a recording command end point.

If 'listen' is selected in FIG. 12B (b), the mobile terminal 100 is able to play back the recorded call content. If 'store' is selected in FIG. 12B (b), the mobile terminal 100 enables the recorded call content to be stored in the memory 160.

Of course, if 'check recording' is selected in FIG. 12A (b), the mobile terminal 100 is able to output information of the recorded call content after the call has been ended.

The setting of the recording start point in ending the recording is explained in detail with reference to FIGS. 13A to 13C as follows. For clarity and convenience of the following description, before a recording start point is set in case of ending a recording, assume that a recording start point of a recorded call content is randomly set to a start point of a buffering interval.

Figure 13B:
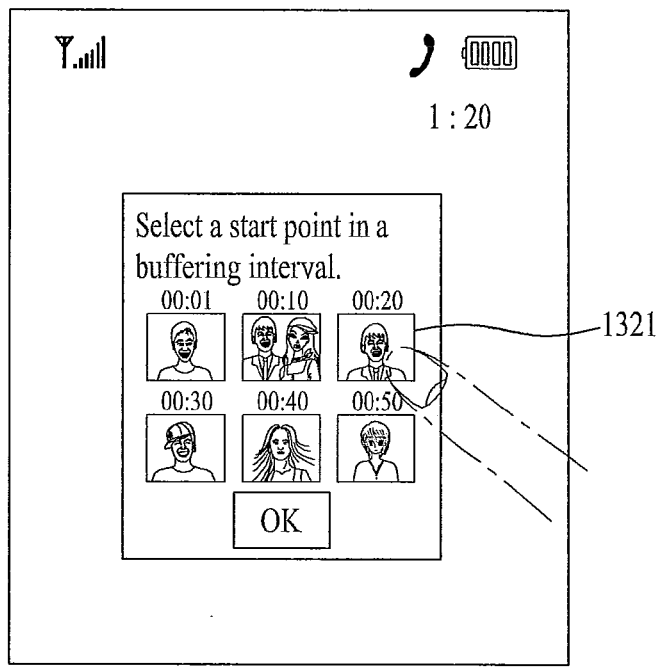
Figure 13C:
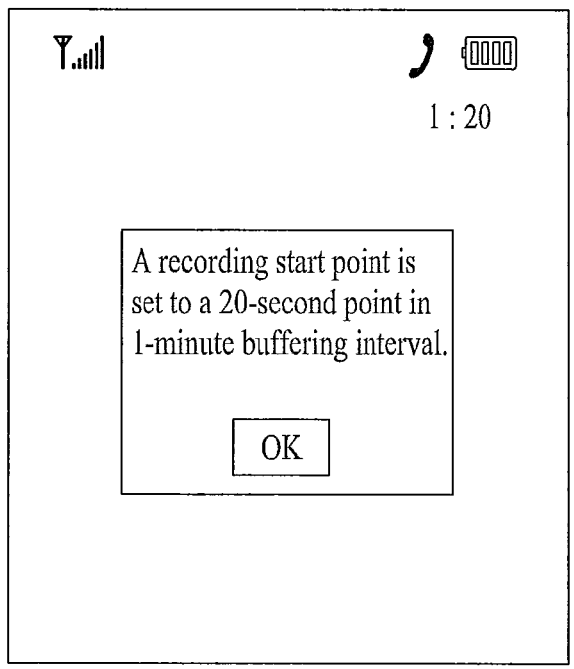

FIGS. 13A to 13C are diagrams of screen configurations for setting a recording start point in a buffering interval in case of a recording end according to the present invention.

Referring to FIGS. 13A to 13C, the mobile terminal 100 is able to display a picture for enabling a recording start point to be set in case of a recording end.

Referring to FIG. 13A, in case of ending a recording, the mobile terminal 100 displays an indicator 1310 corresponding to a whole buffered call content and a pointer 1311 pointing out a specific point in the indicator 1110 and is then able to set a recording start point to a point at which the pointer 1311 is located [a]. Moreover, if the pointer 1311 is located at the specific point and an audio listen region is activated, the mobile terminal 100 is able to output a call content corresponding to the specific point.

Alternatively, in case of ending a recording, the mobile terminal 100 displays a point list including a plurality of points settable as recording start points and is then able to set the recording start point to the point selected from the point list [b]. Moreover, the mobile terminal 100 is able to output a call content corresponding to each of a plurality of the points included in the point list.

Referring to FIG. 13B, when a recording is ended in the course of a video call, the mobile terminal 100 outputs a recorded video (e.g., a still picture) corresponding to each of a plurality of points belonging to a buffering interval and information on the corresponding point to a screen. If a specific recorded video 1321 is selected by a user, the mobile terminal 100 is able to set a recording start point to the point corresponding to the selected specific recorded video 1321.

Therefore, the mobile terminal 100 is able to output a text indicating that the call content is recorded from the above-set recording start point in case of ending the recording [FIG. 13C].

A method of controlling a recording a video inputted via a camera is explained with reference to the accompanying drawings as follows.

Figure 14A:
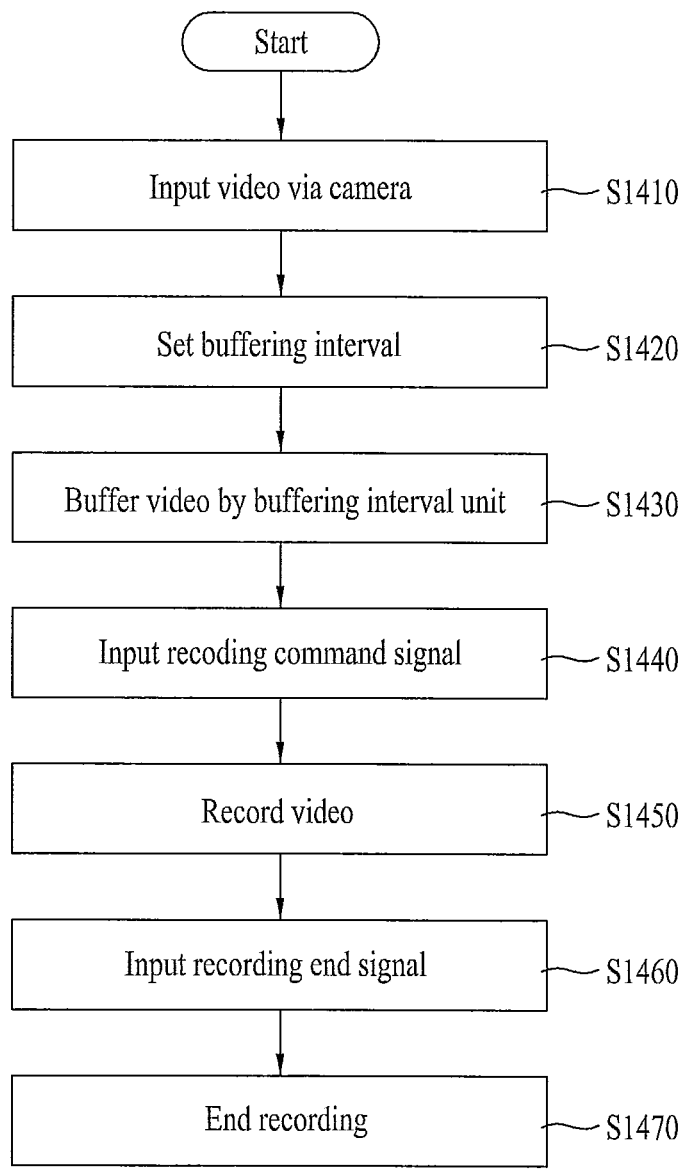
FIG. 14A is a flowchart for a method of controlling a recording of a video inputted via a camera of a mobile terminal according to the present invention.

FIG. 14 is a flowchart for a method of controlling a recording of a video inputted via a camera of a mobile terminal according to the present invention.

Referring to FIG. 14, the mobile terminal 100 receives a video from outside via the camera 121 [S1410].

In this case, the inputted video can be displayed as a preview video via the display unit 151.

The mobile terminal 100 receives a setting of a predetermined time interval (hereinafter named a buffering interval) for buffering the inputted video via the user input unit 130 [S1420]. In this case, the setting step S1420 can be performed prior to or in the course of the video inputting step S1410.

In this case, 'buffering the video in the predetermined time interval' may mean a case that the inputted video is temporarily stored by a predetermined time unit irrespective of a video photographing. For instance, if a predetermined time interval is set to 10 minutes, the inputted video can be stored by a unit of 10 minutes. Besides, the video buffering can be named 'pre-recording' in view point that it is performed before a normal recording.

In the setting step S1420, the mobile terminal 100 is able to further set a video recording environment according to a user action inputted via the user input unit 130 in addition to the buffering interval.

In the following description, the setting step S1420 is further explained in detail with reference to FIGS. 15A to 16B.

FIGS. 15A to 16B are diagrams of screen configurations for setting a video recording environment according to the present invention.

Figure 15A:
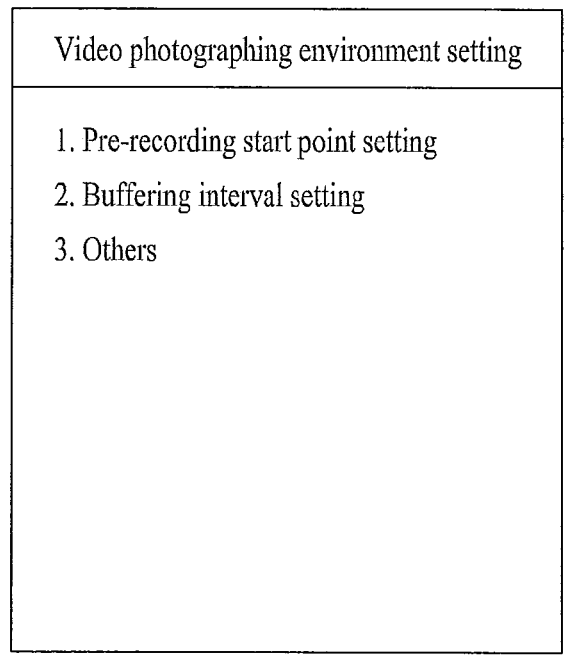

Referring to FIG. 15A, if a menu item or a key (or a key region) related to a video photographing environment setting is selected by a user, the mobile terminal is able to display a menu configuration picture shown in FIG. 15A.

Figure 15B:
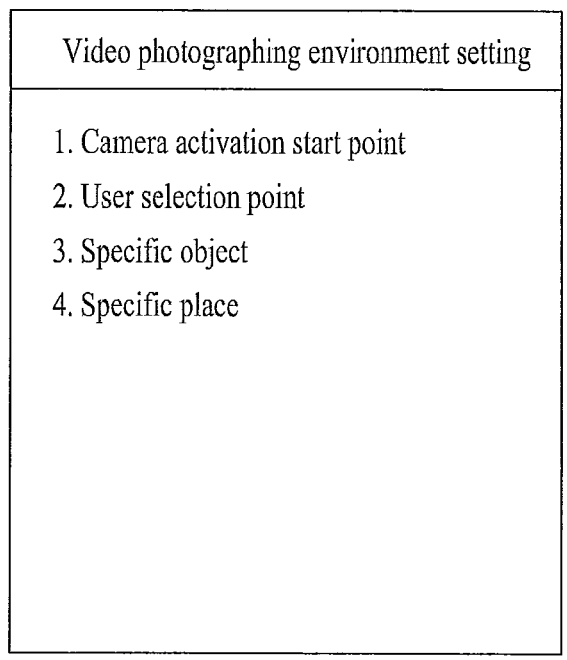

Referring to FIG. 15B, if a menu item 'pre-recording start point setting' is selected in FIG. 15A, the mobile terminal 100 enters a mode for setting a buffering start point of the inputted video and is then able to display a condition list of the buffering start point on a screen.

For instance, if a camera activation start point is selected from the condition list, the mobile terminal 100 is able to buffer the video from a timing point of activating the camera 121. If a user selection point is selected from the condition list, the mobile terminal 100 is able to buffer the video from a timing point of receiving an input of a video buffering command signal from a user.

In the following description, cases of selecting other conditions from the condition list are explained in detail with reference the accompanying drawings.

Figure 16B:
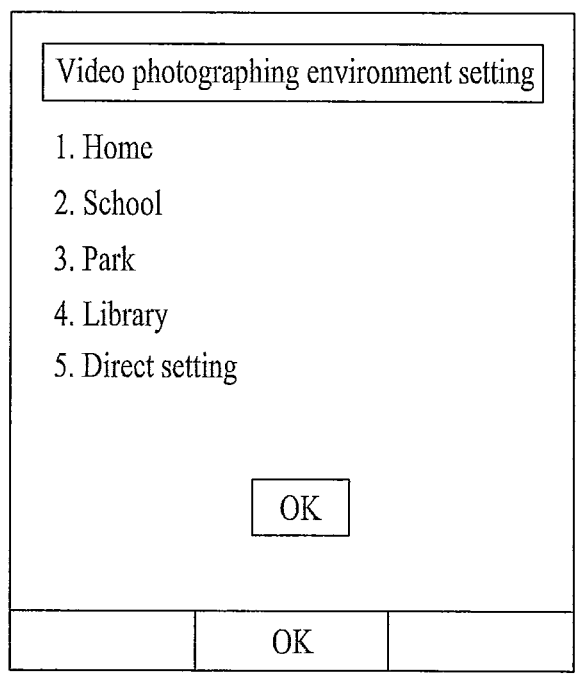

FIG. 16A and FIG. 16B show screen configurations of a case that a specific object s selected from the condition list shown in FIG. 15B.

Referring to FIG. 16A, the mobile terminal 100 displays at least one or more images and is then able to set a specific object to an object included in the image selected from the displayed at least one or more images by a user.

Referring to FIG. 16B, the mobile terminal 100 displays an object condition list and is then able to set a specific object to an object corresponding to an object condition selected from the displayed object condition list.

For instance, the object conditions included in the object condition list include a specific person, a specific building, a specific thing and the like and can also include an object condition (e.g., a specific place name such as a celebrity name, ** coffee shop at Gangnam Station, etc.) directly inputted by a user.

Therefore, if the object included in the selected image or the object corresponding to the selected object condition is included in the inputted video, the mobile terminal 100 is able to start the buffering of the inputted video.

FIG. 16C shows a screen configuration in case that a specific place is selected from the condition list shown in FIG. 15B.

Referring to FIG. 16C, the mobile terminal 100 displays a place list including places settable as specific places and is then able to set a specific place to the place selected from the place list. Therefore, in case of determining that the place selected from the place list is included in the inputted video, the mobile terminal 100 is able to buffer the inputted video from the timing point of making the determination.

Moreover, in case of recording the video including the above-set specific place (this situation shall be described later), the mobile terminal 100 is able to store the recorded video in a manner that the recorded video is linked to a schedule management application.

For instance, a video recorded by including a specific place can be stored in a manner of being linked to a schedule including the specific place.

Figure 15C:
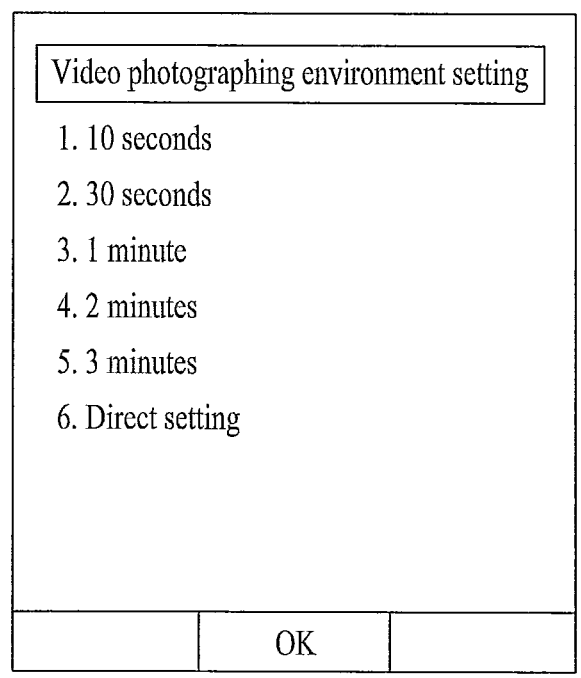

Referring now to FIG. 15A, if a menu item 'buffering interval setting' is selected in FIG. 15A, the mobile terminal 100 is able to display in interval list including settable buffering intervals [FIG. 15C].

For instance, if '10 seconds' is selected from the interval list, the mobile terminal 100 is able to buffer the inputted video by a unit of 10 seconds. If '1 minute' is selected from the interval list, the mobile terminal 100 is able to buffer the inputted video by a unit of 1 minute.

Referring now to FIG. 14, the mobile terminal 100 buffers a currently inputted video in the memory 160 by the buffering interval unit set in the setting step S1420 [S1430].

In particular, the buffering step S1430 can be performed in at least one of a case that a specific object is included in a currently inputted video (cf. FIG. 16A and FIG. 16B), a case that a currently inputted video is a video relating to a specific place (cf. FIG. 16C), and a case that a buffering command signal for the inputted video is directly inputted by a user.

Detailed description of the input of the buffering command signal refers to the former description of the call content buffering.

The mobile terminal 100 receives an input of a recording command signal for a currently inputted video via the user input unit 130 in the course of performing the buffering step S1430 [S1440].

In this case, the recording command signal can include a command signal for recording a currently inputted video and can include a moving picture photographing command signal for example.

Detailed description of the input of the recording command signal refers to the former description of the call content recording.

The inputting step S1440 of the recording command signal is explained in detail with reference to FIG. 17A and FIG. 17B as follows.

FIG. 17A and FIG. 17B are diagrams of screen configurations for receiving an input of a recording command signal in the course of a video buffering according to the present invention.

Referring to FIG. 17A, in case of performing a pre-recording in the course of a video input, the mobile terminal 100 is able to output a text indicating that the pre-recording is performed. For instance, if 'O.K.' is selected in FIG. 17A (b), the mobile terminal 100 performs a pre-recording. If 'cancel' is selected in FIG. 17A (b), the mobile terminal 100 may not perform the pre-recording.

Referring to FIG. 17B (a), in case of performing a pre-recording in the course of a video input, the mobile terminal 100 receives an input of a buffering interval from a user is able to set an interval for buffering an input video to the inputted buffering interval.

Detailed description of the buffering interval setting of the inputted video refers to the former buffering interval setting of the call content.

Referring to FIG. 17B (b), while a pre-recording is performed by a unit of the above-set buffering interval, if a recording command key 1701 provided to a screen is selected by a user, the mobile terminal 100 is able to receive an input of a recording command signal for a currently inputted video.

Referring now to FIG. 14, in case of receiving the recording command signal in the inputting step S1440, the mobile terminal 100 records a video inputted via the camera 121 currently under the control of the controller 180 [S1450]. In this case, the recorded video can be stored in the memory 160.

In the recording step S1450, the mobile terminal 100 is able to record a video from an input point of the recording command signal by including a video from a random point in a time interval corresponding to the buffered video under the control of the controller 180.

In particular, although the mobile terminal 100 performs a recording operation from the input point of the recording command signal, the recorded video can include a video from a random point of the buffered video instead of the input point of the recording command signal.

For instance, the random point in the time interval corresponding to the buffered video can include a start point or a prescribed intermediate point of the video buffered so far.

In the following description, the random point in the time interval corresponding to the buffered video shall be named a recording start point. This is because the recording of video substantially starts with the random point.

The setting of the recording start point is explained in detail with reference to FIG. 18A and FIG. 18B as follows.

Figure 18A:
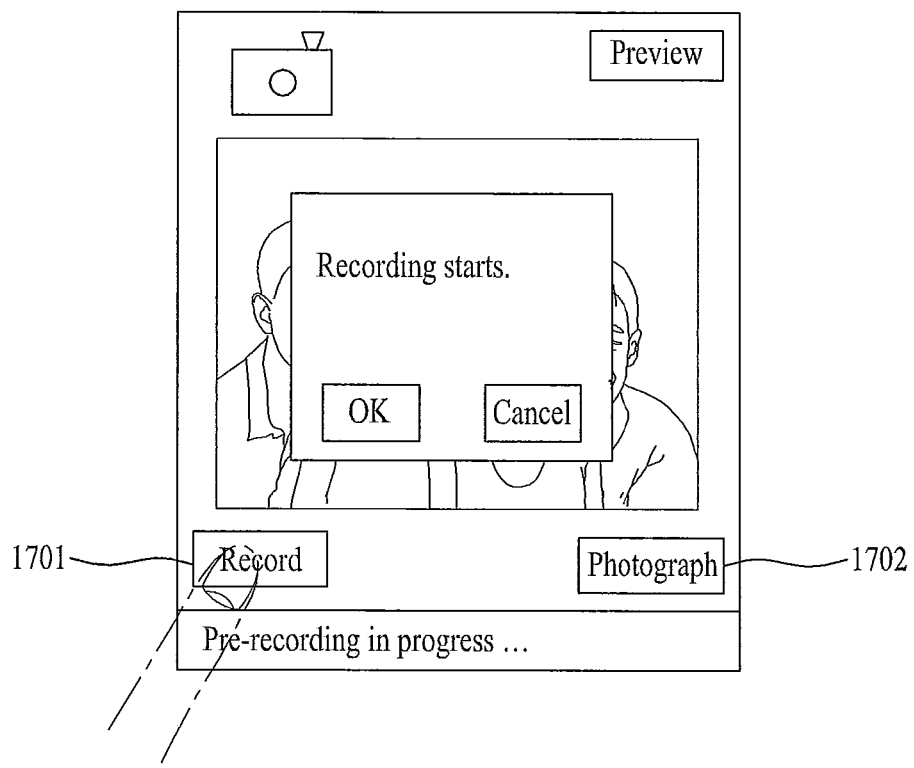
FIG. 18A and FIG. 18B are diagrams of screen configurations for setting a recording start point in a buffering interval in case of receiving an input of a recording command signal in the course of a video buffering according to the present invention.
Figure 18B:
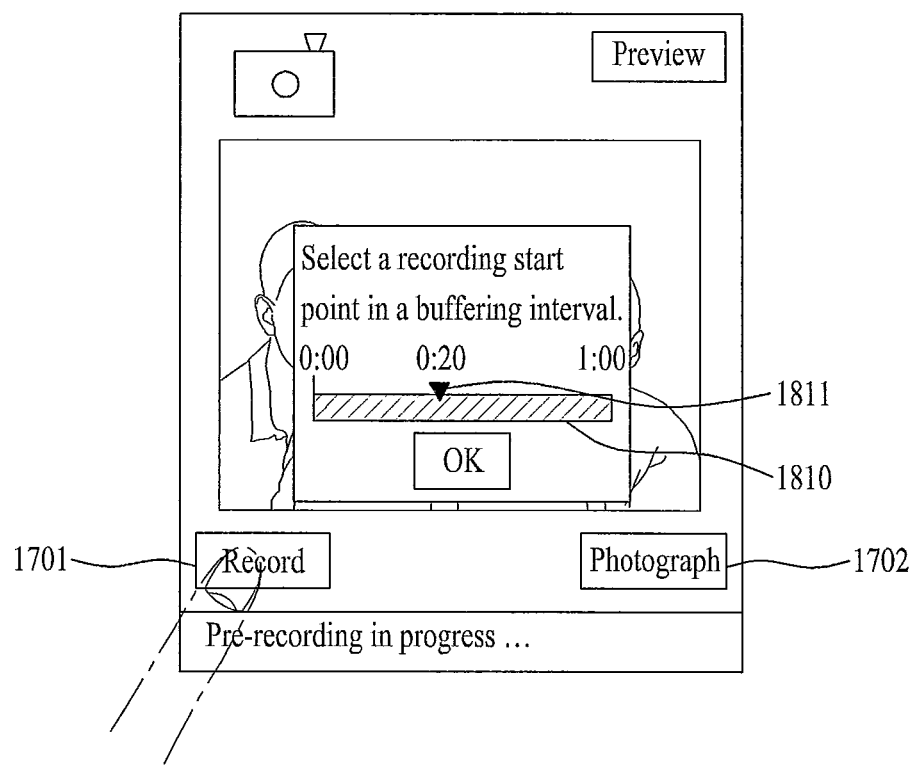

FIG. 18A and FIG. 18B are diagrams of screen configurations for setting a recording start point in a buffering interval in case of receiving an input of a recording command signal in the course of a video buffering according to the present invention.

Referring to FIG. 18A, if the mobile terminal 100 receives an input of a recording command signal, it is able to output a text announcing that a video currently inputted via the camera 121 is to be recorded.

For instance, if 'O.K.' is selected in FIG. 18A, the mobile terminal 100 is able to record a video. If a point setting is selected, the mobile terminal 100 is able to display a picture (hereinafter named a point setting picture) for setting a recording start point.

Referring to FIG. 18B, an indicator 1810 corresponding to a total time of a video buffered so far is displayed on the point setting picture. And, a pointer 1811 can be displayed to point out a specific point in the displayed indictor 1810.

Therefore, a user locates the pointer 1811 at a specific point in the indicator 1810 to set a recording start point to the point at which the pointer 1811 is located.

Meanwhile, the mobile terminal 100 displays a point list including points settable as recording start points on a screen and is then able to set a recording point to the point selected from the point list [not shown in the drawing].

Moreover, the mobile terminal 100 is able to help a user to select a recording start point in a manner of outputting a video corresponding to a point, at which the pointer 1111 is located prior to the setting of the recording start point, or a video corresponding to the point selected from the point list.

Therefore, the mobile terminal 100 is able to record a video starting with the above-set recording start point (i.e., a random point in a buffering interval.

Referring now to FIG. 14, in case of receiving an input of the recording command signal, the mobile terminal 100 controls the memory 160 to interrupt the video buffering operation S1430 under the control of the controller 180 and is able to delete the video behind the recording start point in the buffered video from the memory 160.

The mobile terminal 100 receives an input of a recording end command signal in the course of performing the recording step S1450 [S1460] and is then able to end the recording step S1450 under the control of the controller 180 [S1470].

In this case, the recording end command signal can include a signal for recording audio/video of an performed call content.

Detailed description of the input of the recording end command signal refers to the former description of the input of the recording end command signal of the call content. Moreover, the recording end command signal can be inputted in case that an operation of the camera 21 is terminated.

The input of the recording end command signal is explained in detail with reference to FIG. 19A and FIG. 19B.

Figure 19A:
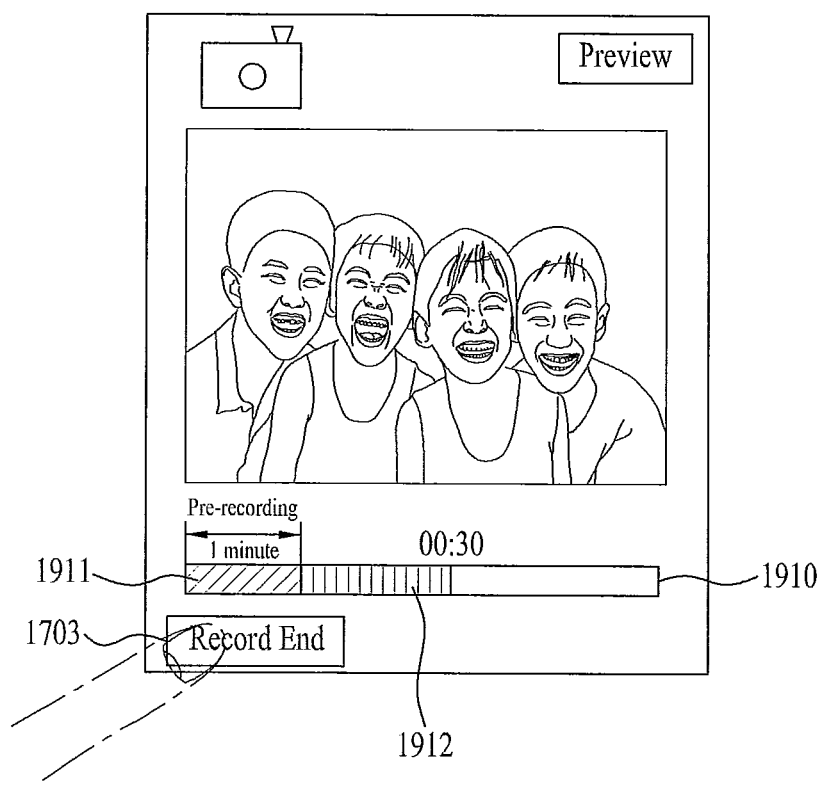

FIG. 19A and FIG. 19B are diagrams of screen configurations for receiving an input of a recording end command signal according to the present invention.

Referring to FIG. 19A, in case that a user selects a recording end key 1703 provided to a screen in the course of recording a video, the mobile terminal 100 is able to receive an input of a recording end command signal. In this case, the recording end key 1703 is the same as the recording command key 1701 and plays a different key function according to whether a recording is performed using the same as the recording command key 1701.

Referring to FIG. 19A, in case of performing a video recording, the mobile terminal 100 displays a currently recorded video on a center of the screen and is also able to display an indicator 1910 indicating a video recording extent on one prescribed region of the screen.

In this case, the indicator 1910 can include a pre-recording part 1911 and a normal recording part 1912. Therefore, the mobile terminal 100 is able to display the pre-recording part 1911 at a start point of the video recording as a recording-completed part.

Referring to FIG. 19B (a), in case of ending a video recording operation, the mobile terminal 100 enables a user to select whether to check recording information on the recorded video.

Referring to FIG. 19B (b), if 'check recording' is selected in FIG. 19B (a), the mobile terminal 100 displays an indicator 1920 indicating a total time (e.g., 1 minute and 30 seconds) corresponding to the recorded video and is also able to display a recording time (i.e., 1 minute) of a pre-recording part 1921 and a recording time (i.e., 30 seconds) of a normal recording part 1922 within the indicator 1920.

In this case, the pre-recording part 1921 includes a video part ranging between a recording start point and a recording command signal input point, while the normal recording part 1922 includes a video part ranging between the recording command signal input point and a recording command end point.

If 'O.K.' is selected in FIG. 19B (b), the mobile terminal 100 is able to play back the recorded video. If 'store' is selected in FIG. 19B (b), the mobile terminal 100 enables the recorded video to be stored in the memory 160.

The setting of the recording start point in ending the recording is explained in detail with reference to FIGS. 20A to 20C as follows. For clarity and convenience of the following description, before a recording start point is set in case of ending a recording end, assume that a recording start point of a recorded video is randomly set to a start point of a buffering interval.

Figure 20C:
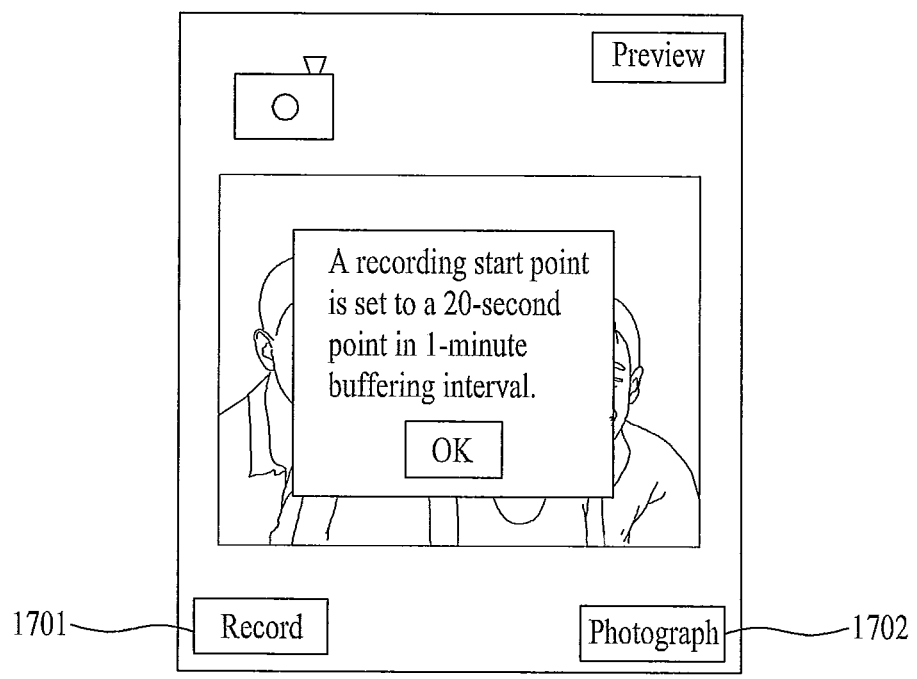

FIGS. 20A to 20C are diagrams of screen configurations for setting a recording start point in a buffering interval in case of a recording end according to the present invention.

Referring to FIGS. 20A to 20C, the mobile terminal 100 is able to display a picture for enabling a recording start point to be set in case of a recording end.

Referring to FIG. 20A, in case of ending a recording, the mobile terminal 100 displays an indicator 2010 corresponding to a whole buffered video and a pointer 2011 pointing out a specific point in the indicator 2010 and is then able to set a recording start point to a point at which the pointer 2011 is located [a]. Moreover, if the pointer 2011 is located at the specific point and a video view region is activated, the mobile terminal 100 is able to output a video corresponding to the specific point.

Alternatively, in case of ending a recording, the mobile terminal 100 displays a point list including a plurality of points settable as recording start points and is then able to set the recording start point to the point selected from the point list [b]. Moreover, the mobile terminal 100 is able to output a video corresponding to each of a plurality of the points included in the point list.

Referring to FIG. 20B, while displaying a preview video on a screen in case of ending a recoding, the mobile terminal 100 outputs a recorded video (e.g., a still picture) corresponding to each of a plurality of points belonging to a buffering interval and information on the corresponding point to a screen. If a specific video 2001 is selected by a user, the mobile terminal 100 is able to set a recording start point to the point corresponding to the selected specific video 2001.

Moreover, referring to FIG. 20B (b), if the specific video 2001 is selected in FIG. 20B (a), the selected specific video 200 can be displayed on a screen center instead of the preview video. If a start point setting region 2002 is selected by a user in FIG. 20B (b), a recording start point can be set to a point corresponding to the specific video 2001 currently displayed instead of the preview video.

Therefore, the mobile terminal 100 is able to output a text indicating that the video is recorded from the above-set recording start point in case of ending the recording [FIG. 20C].

In a video recording controlling method according to the present invention, the mobile terminal 100 sequentially receives an input of a first still picture and an input of a second still picture with a predetermined time interval via the camera 121 and is then able to buffer a video between a photographing point of the first still picture (hereinafter named a first photographing point) and a photographing point of the second still picture (hereinafter named a second photographing point) under the control of the controller 180 [cf. S1430].

And, the mobile terminal 100 is able to recognize a photographing command signal of the second still picture as a recording command signal.

For instance, after completion of the photographing of the first still picture, the mobile terminal 100 performs a video buffering operation. If the second still picture is photographed, the mobile terminal 100 stops the video buffering operation and is then able to perform a video recording operation. In this case, a recording start point of the video recording can include a prescribed point between the first and second photographing points. This is explained in detail with reference to FIGS. 21A to 21C as follows.

Figure 21A:
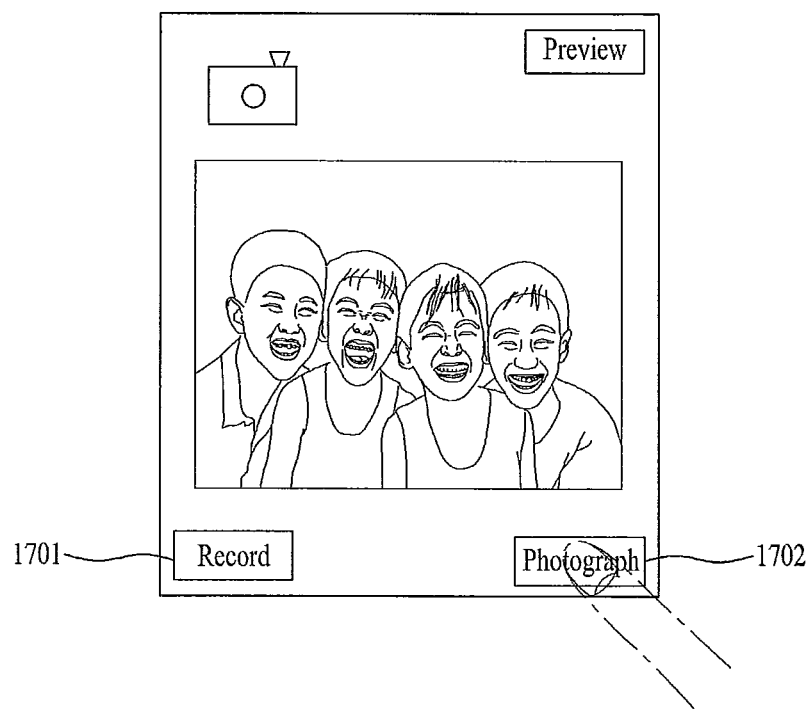
FIGS. 21A to 21C are diagrams of screen configurations for buffering a video from a first photographing point to a second photographing point in case of a sequential photographing of first and second still pictures according to the present invention.
Figure 21B:
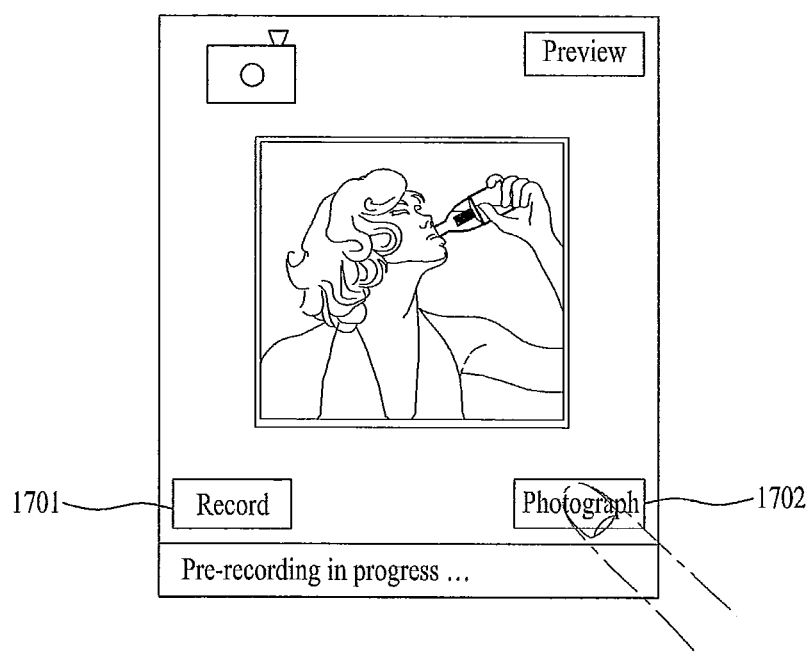
Figure 21C:
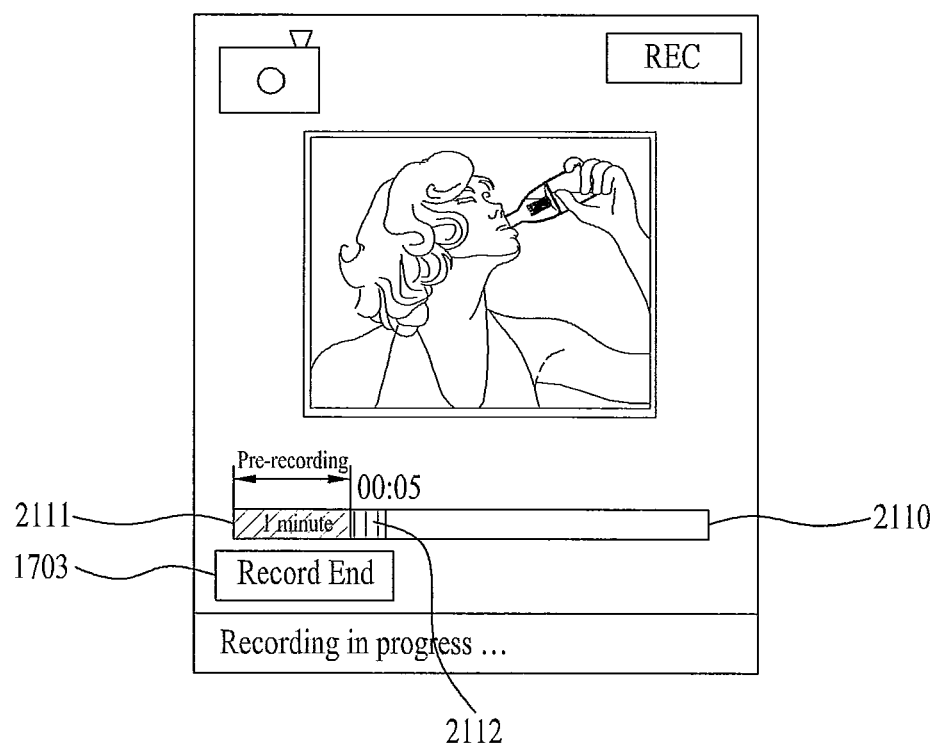

FIGS. 21A to 21C are diagrams of screen configurations for buffering a video from a first photographing point to a second photographing point in case of a sequential photographing of first and second still pictures according to the present invention.

Referring to FIG. 21A, if a photograph key 1702 is activated in the course of displaying a preview video, the mobile terminal 100 photographs a first still picture and is then able to perform a pre-recording of a video from a first photographing point.

Referring to FIG. 21B, if a photograph key 1702 is activated in the course of performing a video pre-recording, the mobile terminal 100 is able to photograph a second still picture.

Referring to FIG. 21C, after completion of photographing the second picture, the mobile terminal 100 ends the pre-recording operation and is then able to perform a video recording from a second photographing point.

For instance, a pre-recording part 2111 in an indicator 2110 shown in FIG. 21C can indicate a time interval between the first photographing point and the second photographing point.

Meanwhile, in case of determining that the camera 121 fails to face forward in the course of buffering a currently inputted video, the mobile terminal 100 is able to interrupt the buffering operation under the control of the controller 180. In case of determining that the camera 121 faces forward again, the mobile terminal 100 is able to resume the interrupted buffering operation [not shown in the drawings].

The mobile terminal 100 includes a motion detecting sensor (not shown in the drawings) and is then able to determine whether the camera 121 faces forward or not using the motion detecting sensor.

In this case, 'facing forward' means a state that the camera 121 does not incline in any direction and can include a state that the camera 121 inclines within a predetermined angle horizontally or vertically. For instance, the predetermined angle can include 10 degrees more or less.

In the following description, explained is a case of performing a recording controlling method according to the present invention in association with another application.

According to the present invention, the mobile terminal 100 is able to perform a pre-recording operation or a buffering operation in performing an audio recording. In particular, the mobile terminal 100 is able to perform the audio recording in a manner of setting an audio recording start point to a random point in a time interval corresponding to a pre-recorded audio. This is explained in detail with reference to the accompanying drawings as follows.

FIGS. 22A to 23C are diagrams of screen configurations for recording a audio using a pre-buffering in case of performing a audio recording according to the present invention.

Referring to FIG. 22A, if a user selects a menu item or a key (or a key region) related to an audio recording environment setting, the mobile terminal 100 is able to display a menu configuration picture shown in FIG. 22A.

Figure 23A:
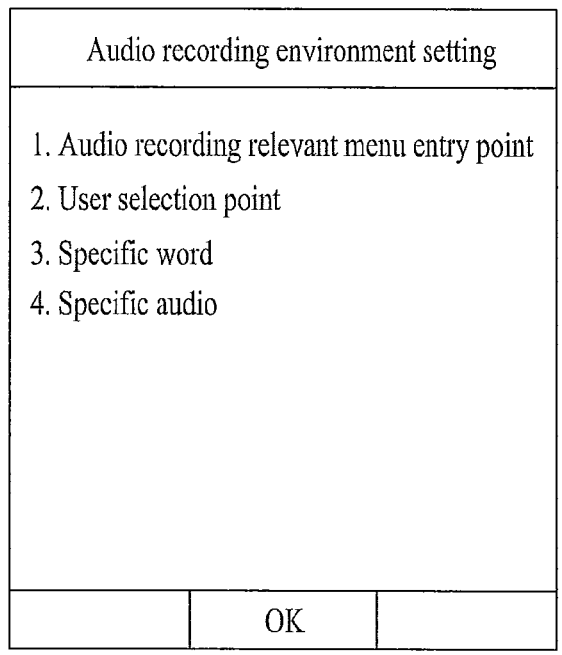

Referring to FIG. 23A, if a menu item 'pre-recording start point setting' is selected in FIG. 22A, the mobile terminal 100 enters a mode for setting a recording start point of an audio recording and is able to display a condition list of the recording start point on a screen.

For instance, if an audio recording relevant menu entry point is selected from the condition list, the mobile terminal 100 externally receives an input of an audio from a point of entering the audio recording relevant menu then buffers the inputted audio. If a user selection point is selected from the condition list, the mobile terminal 100 externally receives an input of an audio from a point of receiving an input of a command signal of audio buffering from a user and then buffers the inputted audio. If a specific word or audio is selected from the condition list, the mobile terminal 100 sets the specific word or audio to a word or audio inputted by a user. If an audio corresponding to the above-set specific word or the above-set specific audio is detected, the mobile terminal 100 externally receives an input of an audio and then buffers the inputted audio.

Figure 23B:
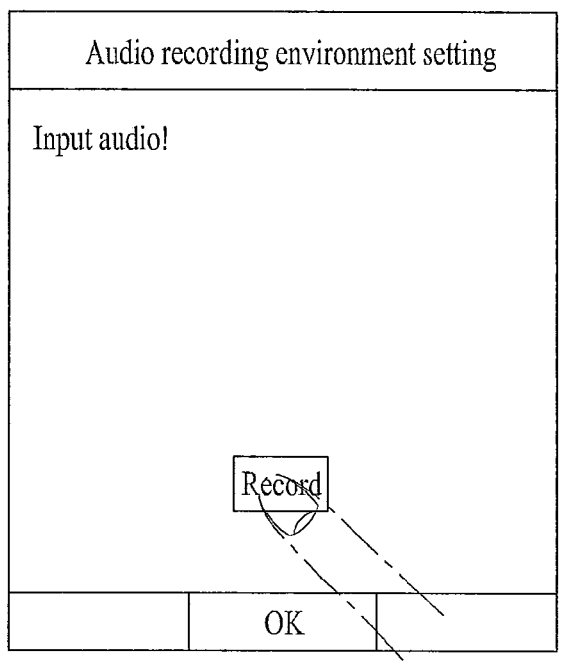
Figure 23C:
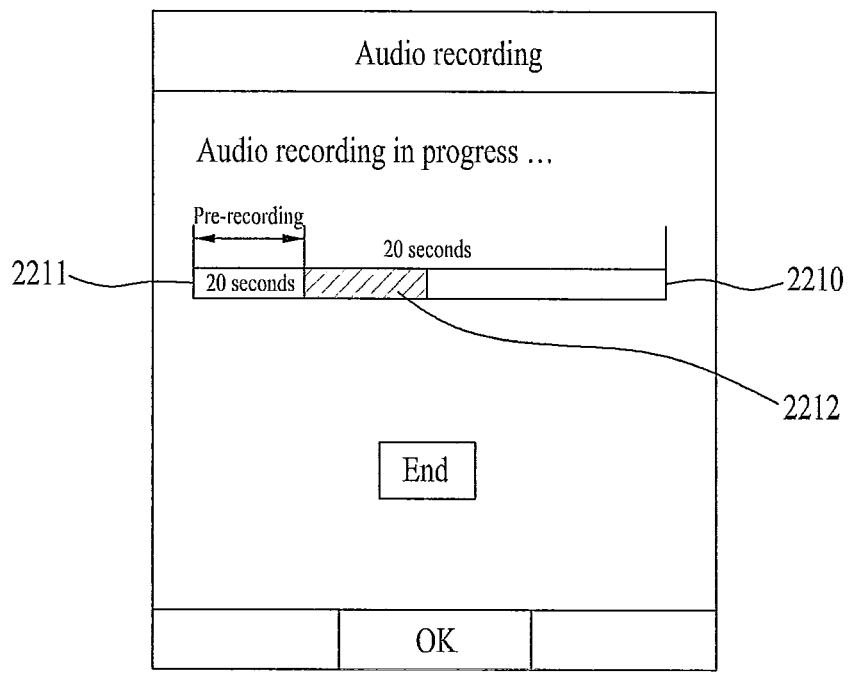

Referring to FIG. 23B and FIG. 23C, in case of receiving an input of an audio recording command signal in the course of an audio buffering operation, the mobile terminal 100 is able to record an externally inputted audio. In this case, a recording start point can include a random point in a time interval corresponding to the buffered audio.

Particularly, referring to FIG. 23C, the mobile terminal 100 is able to discriminatively display a pre-recording part 2211 and a normal recording part 2212 on an indicator 2210 indicating an audio recording extent. At an audio recording start point, the pre-recording part 2211 on the indicator 2210 can be displayed as a recording-completed part.

The aforesaid call content recording controlling methods according to various embodiments of the present invention are applicable to an audio recording controlling method.

According to the present invention, the mobile terminal 100 is able to perform a pre-recording operation or a buffering operation in radio listening. The mobile terminal 100 is able to perform a radio broadcast recording in a manner of setting a recording start point of a radio broadcast to a random point in a time interval corresponding to the pre-recorded radio broadcast. This is explained in detail with reference to the accompanying drawings as follows.

Figure 24A:
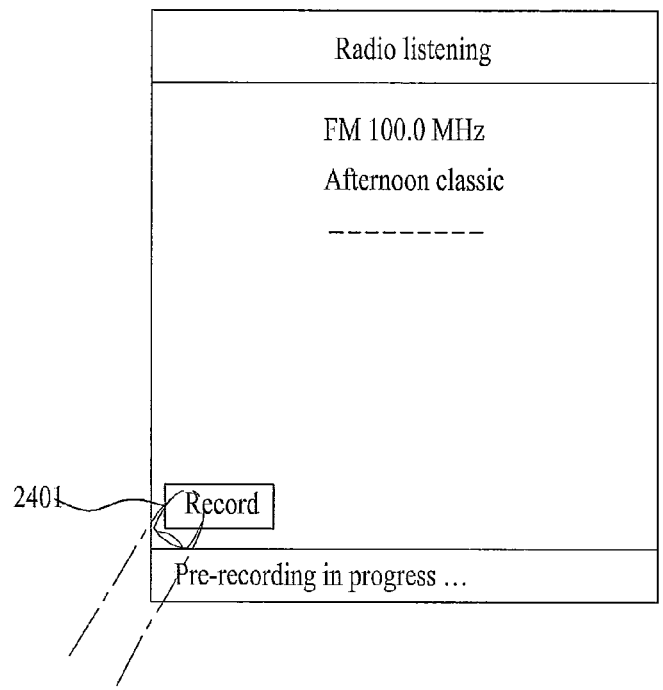
FIGS. 24A to 24C are diagrams of screen configurations for recording a radio broadcast content using a pre-buffering in case of a radio listening according to the present invention.
Figure 24B:
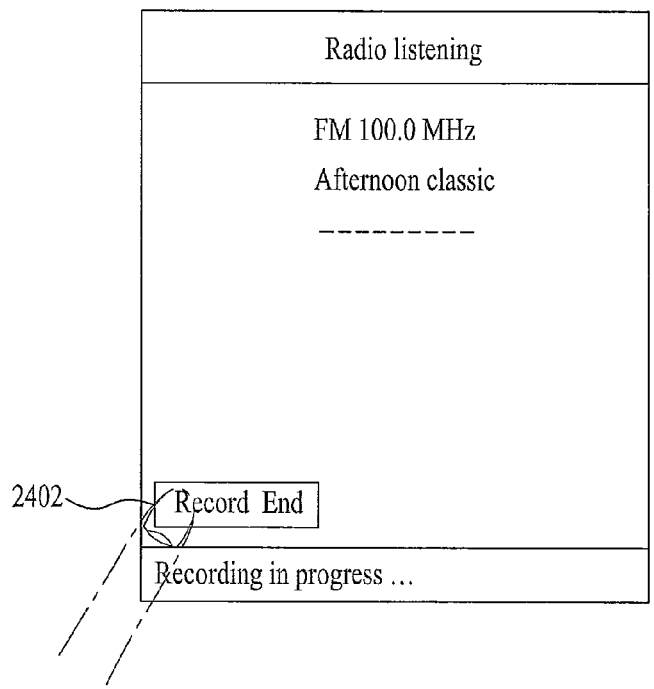
Figure 24C:
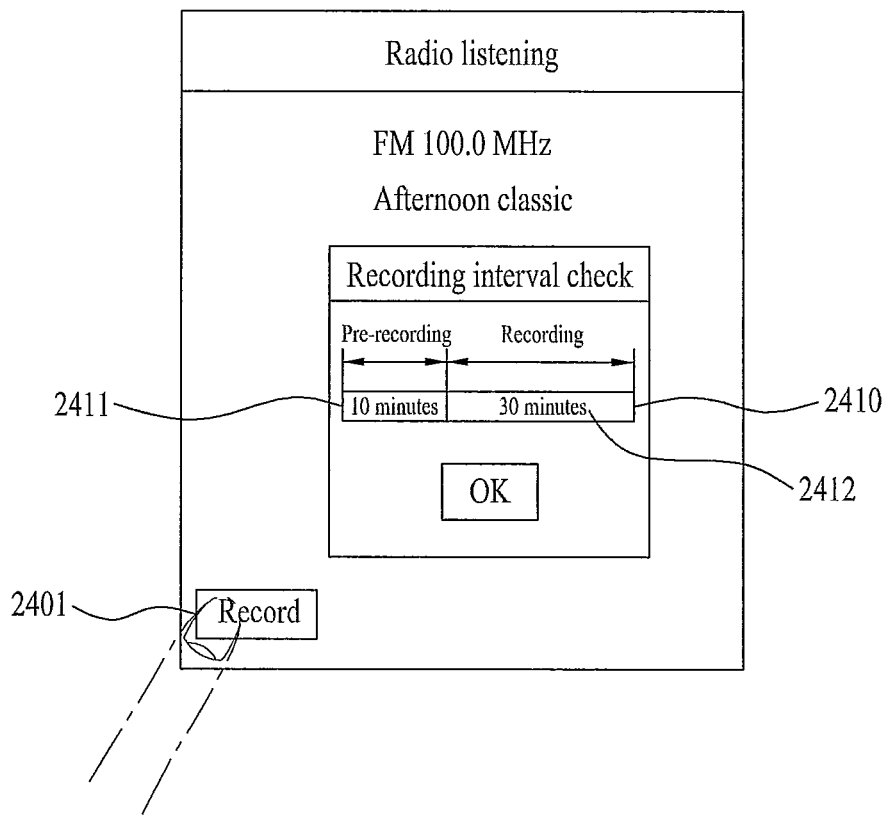

FIGS. 24A to 24C are diagrams of screen configurations for recording a radio broadcast content using a pre-buffering in case of a radio listening according to the present invention.

Referring to FIG. 24A, the mobile terminal 100 is able to perform a pre-recording operation in the course of a radio broadcast listening. If a user selects a recording command key 2401, the mobile terminal 100 can receive an input of a recording command signal for a radio broadcast in the course of a pre-recording operation.

Referring to FIG. 24B, in case of receiving the input of the recording command signal, the mobile terminal 100 performs a recording operation of a radio broadcast and is able to interrupt the pre-recording operation for the radio broadcast. In this case, a recoding start point of the radio broadcast can include a random point in a time interval corresponding to the buffered radio broadcast.

Referring to FIG. 24C, in case of receiving an input of a recording end command signal, the mobile terminal 100 is able to end the recording of the radio broadcast.

Particularly, in case of ending the recording, the mobile terminal 100 is able to discriminatively display a pre-recording part 2411 and a normal recording part 2412 on an indicator 241 indicating a total amount of the recorded radio.

The aforesaid call content recording controlling methods according to various embodiments of the present invention are applicable to a radio broadcast recording controlling method.

According to the present invention, the mobile terminal 100 is able to perform a pre-recording operation or a buffering operation in TV broadcast viewing. The mobile terminal 100 is able to perform a TV broadcast recording in a manner of setting a recording start point of a TV broadcast to a random point in a time interval corresponding to the pre-recorded TV broadcast. This is explained in detail with reference to the accompanying drawings as follows.

FIGS. 25A to 26B are diagrams of screen configurations for recording a TV broadcast content using a pre-buffering in case of a TV broadcast viewing according to the present invention.

Figure 25A:
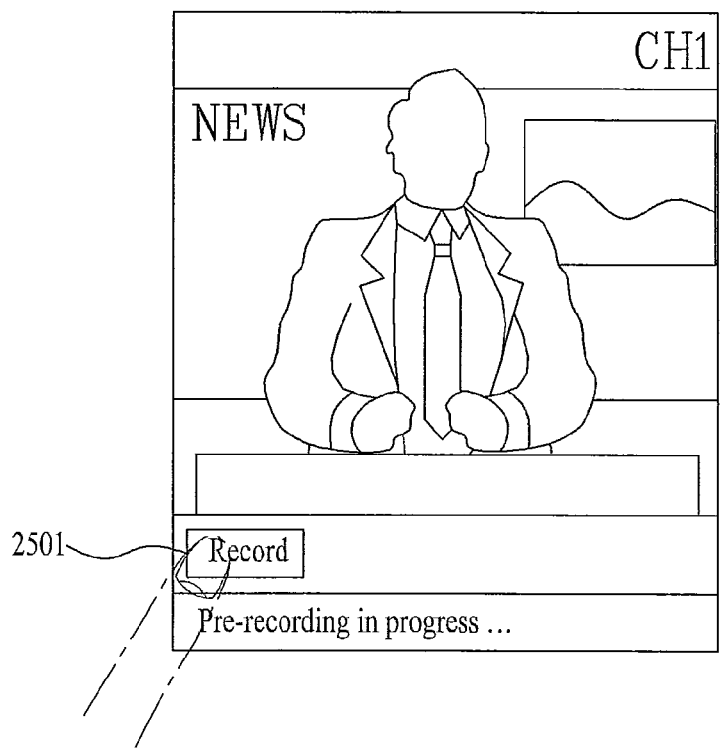
FIGS. 25A to 26B are diagrams of screen configurations for recording a TV broadcast content using a pre-buffering in case of a TV broadcast viewing according to the present invention.

Referring to FIG. 25A, the mobile terminal 100 is able to perform a pre-recording operation in the course of a TV broadcast viewing. If a user selects a recording command key 2501, the mobile terminal 100 can receive an input of a recording command signal for a TV broadcast in the course of a pre-recording operation.

Figure 25B:
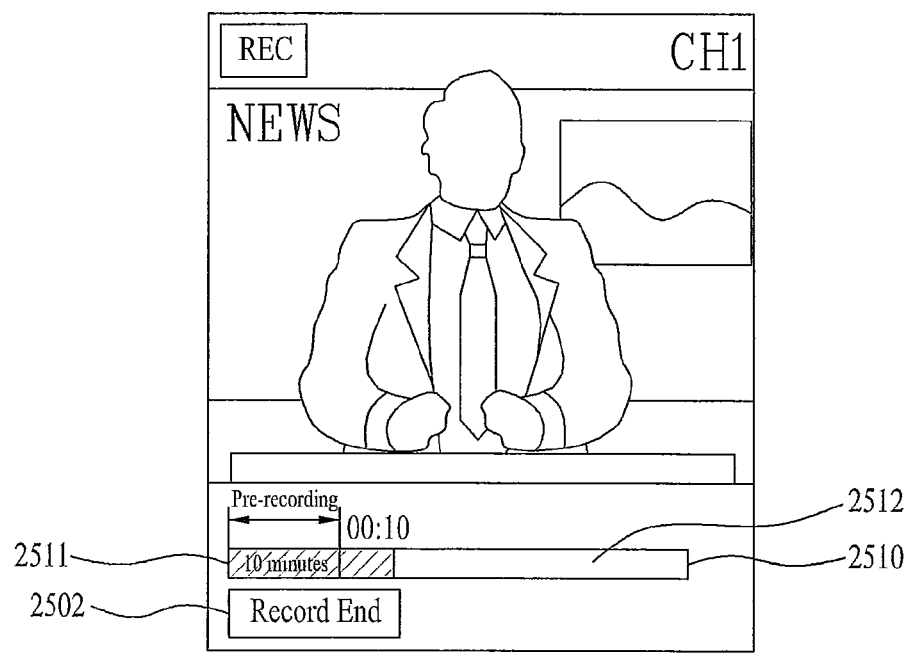

Referring to FIG. 25B, in case of receiving the input of the recording command signal, the mobile terminal 100 performs a recording operation of a TV broadcast and is able to interrupt the pre-recording operation for the TV broadcast. In this case, a recoding start point of the TV broadcast can include a random point in a time interval corresponding to the buffered TV broadcast.

Particularly, in FIG. 25B, an indicator 2510 indicating a TV broadcast recording extent on a prescribed region of a screen. When a recording starts, a pre-recoding part 2511 can be displayed as a recording completed part.

Figure 25C:
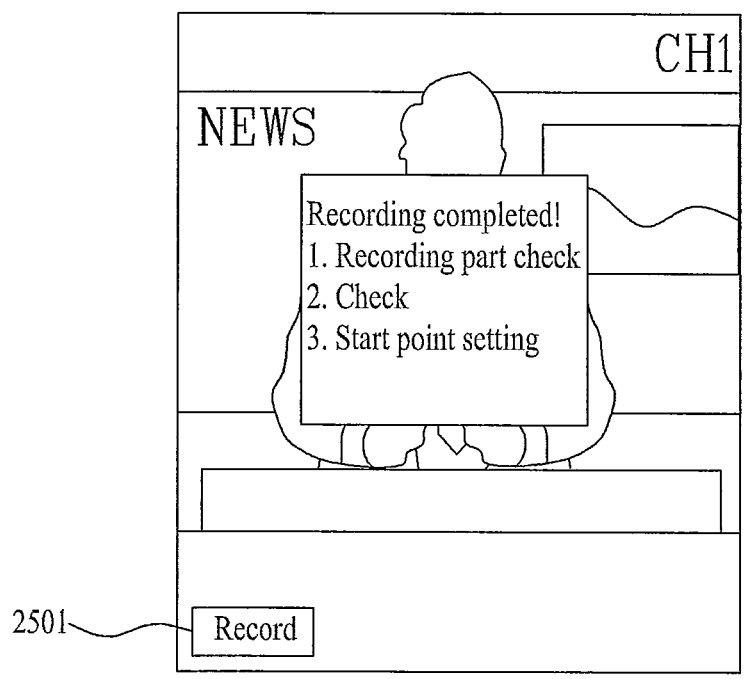

Referring to FIG. 25C, in case of receiving an input of a recording end command signal (e.g., a recording end command key 2502 is selected), the mobile terminal 100 ends a recording of a TV broadcast and is able to display menu items related to the recording completion.

Figure 26A:
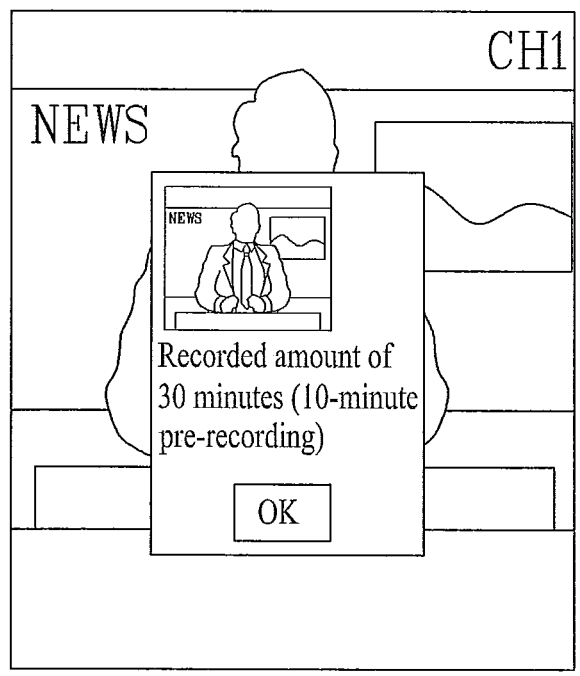

Referring to FIG. 26A, if 'check recoding part' is selected in FIG. 25C, the mobile terminal 100 is able to output information on the recorded TV broadcast (e.g., representative image, total recording time, pre-recording time, etc.).

Referring to FIG. 26B, if 'start point setting' is selected in FIG. 25C, the mobile terminal 100 is ale to display a broadcast picture and point information, which corresponding to each of a plurality of points belonging to a time interval corresponding to the buffered TV broadcast, on a screen [a].

If a specific broadcast picture 2601 is selected by a user from the displayed broadcast picture, the mobile terminal 100 is able to set a TV broadcast recording start point to a point corresponding to the selected specific broadcast picture 2601 [b].

Meanwhile, regarding the TV broadcast recording controlling method, if a recording reservation for a TV broadcast is set, the mobile terminal 100 can perform a pre-recording operation of the TV broadcast starting with a point behind a recording reservation point by a predetermined time [not shown in the drawings]. In this case, the predetermined time is set by a user or can be randomly set by the terminal.

According to one embodiment of the present invention, the above-described recording controlling methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet).

Accordingly, the present invention provides the following effects and/or advantages.

First of all, since a pre-recording is performed prior to a call content recording in case of performing a call, it is able to record a call content from a random timing point prior to a timing point of inputting a recording command signal from a user.

Secondly, since a pre-recording is performed ahead of a video recording in performing a video input via a camera, a video can be recorded from a random timing point before a timing point of inputting a recording command signal from a user.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
a camera configured to receive a preview image;
a memory configured to buffer the preview image by a predetermined time unit;
a display including an upper main display portion and a lower display portion and configured to display the preview image in the main display portion; and
a controller configured to:
receive a touch input of a capture icon on the display,
buffer the preview image currently being displayed in the main display portion,
display a plurality of thumbnail images in the lower display portion below the main display portion when the capture icon is selected, wherein the plurality of thumbnail images include at least a thumbnail image of the preview image being displayed when the capture icon was touched and thumbnail images of the preview image before the capture icon was touched,
receive a touch selection of one of the thumbnails displayed in the lower display portion,
display the touch selected thumbnail image in the main display portion, and
maintain the display of the plurality of thumbnail images including the touch selected thumbnail image in the lower display portion.

2. The mobile terminal of claim 1, wherein the camera photographs a first still picture and a second still picture sequentially when the capture icon is selected,
wherein the controller controls the memory to buffer the preview image ranging between a photographing point of the first still picture and a photographing point of the second still picture, and
wherein the selected capture icon corresponds to a photographing command signal for the second still picture.

3. The mobile terminal of claim 1, wherein the controller receives a setting of a predetermined time interval for buffering the received preview image.

4. The mobile terminal of claim 3, wherein the controller receives a selection of a random point in the time interval.

5. The mobile terminal of claim 4, wherein when the capture icon is selected, the controller controls the memory to interrupt the buffering of the preview image and to delete the preview image before the random point in the preview image buffered up to the input point of the selected capture icon.

6. The mobile terminal of claim 4, wherein when a recording end command signal is received, a recorded image includes the preview image corresponding to a period between the random point and an input point of the recording end command signal.

7. The mobile terminal of claim 6, wherein the display displays an indicator indicating a recording extent of the recorded image, and
wherein the indicator represents the recorded image corresponding between the random point and the input point of the recording command signal as a recording completed part.

8. A method of controlling a mobile terminal, the method comprising:
receiving, via a camera, a preview image;
buffering, via a memory, the preview image by a predetermined time unit;
displaying, via a display including an upper main display portion and a lower display portion, the preview image in the main display portion;
receiving, via a controller, a touch input of a capture icon on the display;
buffering, via the memory, the preview image currently being displayed in the main display portion;
displaying, via the display, a plurality of thumbnail images in the lower display portion below the main display portion when the capture icon is selected, wherein the plurality of thumbnail images include at least a thumbnail image of the preview image being displayed when the capture icon was touched and thumbnail images of the preview image before the capture icon was touched;
receiving, via the controller, a touch selection of one of the thumbnails displayed in the lower display portion;
displaying, via the display, the touch selected thumbnail image in the main display portion; and maintaining, via the controller, the display of the plurality of thumbnail images including the touch selected thumbnail image in the lower display portion.

9. The method of claim 8, wherein the camera photographs a first still picture and a second still picture sequentially when the capture icon is selected, wherein the buffering step buffers the preview image ranging between a photographing point of the first still picture and a photographing point of the second still picture, and wherein the selected capture icon corresponds to a photographing command signal for the second still picture.

10. The method of claim 8, further comprising:

receiving, via the controller, a setting of a predetermined time interval for buffering the received preview image.

11. The method of claim 10, wherein the receiving the setting receives a selection of a random point in the time interval.

12. The method of claim 11, wherein when the capture icon is selected, the method further comprises interrupting the buffering of the preview image and deleting the preview image before the random point in the preview image buffered up to the input point of the selected capture icon.

13. The method of claim 11, wherein when a recording end command signal is received, a recorded image includes the preview image corresponding to a period between the random point and an input point of the recording end command signal.

14. The method of claim 13, wherein the displaying step further displays an indicator indicating a recording extent of the recorded image, and wherein the indicator represents the recorded image corresponding between the random point and the input point of the recording command signal as a recording completed part.

* * * * *